United States Patent
Pan et al.

(10) Patent No.: US 11,259,219 B2
(45) Date of Patent: Feb. 22, 2022

(54) COMMUNICATION METHOD, APPARATUS, AND SYSTEM

(71) Applicant: HUAWEI TECHNOLOGIES CO., LTD., Guangdong (CN)

(72) Inventors: Kai Pan, Shanghai (CN); Jing Chen, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 43 days.

(21) Appl. No.: 16/804,293

(22) Filed: Feb. 28, 2020

(65) Prior Publication Data
US 2020/0205045 A1    Jun. 25, 2020

Related U.S. Application Data

(63) Continuation of application No. PCT/CN2018/102230, filed on Aug. 24, 2018.

(30) Foreign Application Priority Data

Aug. 31, 2017 (CN) .......................... 201710771132.8

(51) Int. Cl.
*H04W 36/00* (2009.01)
*H04W 36/08* (2009.01)
*H04W 36/38* (2009.01)

(52) U.S. Cl.
CPC ... *H04W 36/0038* (2013.01); *H04W 36/0027* (2013.01); *H04W 36/08* (2013.01); *H04W 36/38* (2013.01)

(58) Field of Classification Search
CPC ......... H04W 36/0038; H04W 36/0027; H04W 36/08; H04W 36/38
(Continued)

(56) References Cited

U.S. PATENT DOCUMENTS

2014/0369315 A1* 12/2014 Norrman ............... H04W 40/04
                                                               370/331
2017/0195935 A1   7/2017 Xu et al.
(Continued)

FOREIGN PATENT DOCUMENTS

CN    101222322 A    7/2008
CN    101953193 A    1/2011
(Continued)

OTHER PUBLICATIONS

Ericsson, "Discussion on the signalling and negotiation of the NR security capabilities," 3GPP TSG SA WG3 (Security) Meeting #88, S3-171923, Dali, China, Aug. 7-11, 2017, 5 pages.
(Continued)

*Primary Examiner* — Faisal Choudhury
(74) *Attorney, Agent, or Firm* — Fish & Richardson P.C.

(57) ABSTRACT

Embodiments of the present invention provide a communication method. The communication method includes: performing, by a terminal, a handover from a source base station to a target base station via an interface between the source base station and the target base station, obtaining, by the target base station, a first security capability, and sending, by the target base station, the first security capability to another base station, to establish dual connections. The source base station does not support the first security capability, and the target base station, the another base station, and a core-network network element support the first security capability. The target base station obtains the first security capability, so that the terminal can establish the dual connections to the target base station and the another base station.

17 Claims, 14 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2018/0227282 | A1* | 8/2018 | Lee | H04W 76/15 |
| 2018/0249331 | A1* | 8/2018 | Chen | H04L 63/062 |
| 2019/0174311 | A1* | 6/2019 | Hayashi | H04W 12/0431 |
| 2019/0394651 | A1* | 12/2019 | Wifvesson | H04W 12/033 |

FOREIGN PATENT DOCUMENTS

| | | |
|---|---|---|
| CN | 102340772 A | 2/2012 |
| CN | 102413461 A | 4/2012 |
| CN | 104067650 A | 9/2014 |
| CN | 104349312 A | 2/2015 |
| CN | 105429750 A | 3/2016 |
| JP | 2015508623 A | 3/2015 |
| WO | 2016148357 A1 | 9/2016 |

OTHER PUBLICATIONS

Office Action issued in Chinese Application No. 201710771132.8 dated Dec. 2, 2020, 10 pages.
Extended European Search Report issued in European Application No. 18851269.3 dated Aug. 21, 2020, 10 pages.
Huawei et al., "Security capability handling for tight interworking," 3GPP TSG-RAN WG2#98, R2-1705159, Hangzhou, China, May 15-19, 2017, 4 pages.
3GPP RAN2, "Reply LS on algorithm selection in E-UTRA-NR Dual Connectivity," 3GPP TSG SA WG3 (Security) Meeting #88, S3-171720, Dali, China, Aug. 7-11, 2017, 2 pages.
3GPP TS 33.401 V15.0.0 (Jun. 2017), "3rd Generation Partnership Project;Technical Specification Group Services and System Aspects; 3GPP System Architecture Evolution (SAE); Security architecture (Release 15)," Jun. 2017, 153 pages.
3GPP TS 36.413 V14.3.0 (Jun. 2017), "3rd Generation Partnership Project; Technical Specification Group Radio Access Network; Evolved Universal Terrestrial Radio Access Network (E-UTRAN); S1 Application Protocol (S1AP) (Release 14)," Jun. 2017, 347 pages.
3GPP TS 36.423 V14.3.0 (Jun. 2017), "3rd Generation Partnership Project; Technical Specification Group Radio Access Network; Evolved Universal Terrestrial Radio Access Network (E-UTRAN); X2 application protocol (X2AP) (Release 14)," Jun. 2017, 242 pages.
Ericsson, "Clause 8.1.2.1.2 (AS algo negotiation during Xn-handover)," 3GPP TSG SA WG3 (Security) Meeting #88, S3-171889, Dali, China, Aug. 7-11, 2017, 2 pages.
Ericsson, "Mechanism for NR security capabilities signalling and negotiation," 3GPP TSG SA WG3 (Security) Meeting #88, S3-171925, Dali, China, Aug. 7-11, 2017, 3 pages.
Huawei et al., "Discussion on the handling of NR security capability," 3GPP TSG SA WG3 (Security) Meeting #88, S3-171840, Dali, China, Aug. 7-11, 2017, 2 pages.
PCT International Search Report and Written Opinion issued in International Application No. PCT/CN2018/102230 dated Nov. 29, 2018, 18 pages (with English translation).
Qualcomm Incorporated et al., "Solution for Dual Connectivity between MeNB and SgNB," 3GPP TSG-SA WG3 Meeting #87, S3-171487, Ljubljana, Slovenia, May 15-19, 2017, 13 pages.
SA3, "LS on algorithm selection in E-UTRA-NR Dual Connectivity," 3GPP TSG-SA WG3 Meeting #87, Tdoc S3-171485, Ljubljana, Slovenia, May 15-19, 2017, 1 page.
Search Report issued in Chinese Application No. 201810892458.0 dated Nov. 1, 2018, 11 pages.
Korean Office Action in Korean Application No. 20207009078, dated Jan. 26, 2021, 10 pages.

* cited by examiner

| 8 | 7 | 6 | 5 | 4 | 3 | 2 | 1 | |
|---|---|---|---|---|---|---|---|---|
| Security capability information element ||||||||  Byte 1 |
| Length of security capability content ||||||||  Byte 2 |
| EEA0 | EEA1 | EEA2 | EEA3 | | | | | Byte 3 |
| EIA0 | EIA1 | EIA2 | EIA3 | | | | | Byte 4 |
| | | | | | | | | Byte 5* |
| | | | | | | | | Byte 6* |
| | | | | | | | | Byte 7* |

FIG. 7a

| Byte 1 ||||||| Byte 2 ||||||||| |
|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | |
| EEA1 | EEA2 | EEA3 | | | | | | | | | | | | | | Encryption algorithm |
| EIA1 | EIA2 | EIA3 | | | | | | | | | | | | | | Integrity protection algorithm |

Used to store a 4G security capability | Used to store a 5G security capability

FIG. 7b

COMMUNICATION METHOD, APPARATUS, AND SYSTEM

CROSS-REFERENCE TO RELATED APPLICATIONS

This application is a continuation of International Application No. PCT/CN2018/102230, filed on Aug. 24, 2018, which claims priority to Chinese Patent Application No. 201710771132.8, filed on Aug. 31, 2017. The disclosures of the aforementioned applications are hereby incorporated by reference in their entireties.

TECHNICAL FIELD

This application relates to the field of wireless communications technologies, and in particular, to a communication method, an apparatus, and a system.

BACKGROUND

Continuous development of communications technologies and diversity of communications services bring an increasing amount of user service data and an increasingly high requirement for a network speed. To satisfy user requirements, operators keep improving capabilities of network devices and network solutions, to increase a user data transmission rate. In a communications system of an operator, base stations with different capabilities may exist, and a terminal may access the base stations with different capabilities for service implementation.

After a terminal establishes communication with a base station, the terminal may be handed over from the current base station to a target base station due to reasons of coverage, load, a service, or the like, for example, the terminal moves to a cell coverage edge and signals become weak, or load of a current serving cell of the terminal is relatively heavy and load of a neighboring cell is lighter. After the terminal is handed over to the target base station, the target base station can maintain communication with the terminal and continues to provide a service for the terminal. However, because base stations have different capabilities, a radio resource throughput of the target base station possibly cannot meet a requirement of the terminal, and therefore a user cannot obtain better experience.

SUMMARY

Embodiments of the present invention provide a communication method and an apparatus, so as to increase a radio resource throughput after a terminal is handed over from a source base station to a target base station based on an interface between the base stations.

A first aspect of the embodiments of the present invention provides a communication method. In this method, a terminal is handed over from a first base station to a second base station via an interface between the first base station and the second base station, where the first base station does not support a first security capability and the second base station supports the first security capability. The first base station is a source base station in the handover, and the second base station is a target base station in the handover. The second base station obtains the first security capability and sends the first security capability to a third base station supporting the first security capability, to establish dual connections.

During the handover of the terminal from the first base station to the second base station via the interface between the first base station and the second base station, the second base station obtains the first security capability and sends the first security capability to the third base station, so that the terminal may establish dual connections to the second base station and the third base station. In other words, a connection exists between the terminal and the second base station, and a connection also exists between the terminal and the third base station. In this method, a problem that a radio resource throughput still cannot meet a user requirement after the terminal is handed over to the target base station can be resolved. The dual connections are established between the terminal and the target base station and the third base station, so that the terminal can obtain more radio resources and a higher data transmission rate, thereby increasing the radio resource throughput and improving user experience.

Optionally, that the second base station obtains the first security capability includes: sending, by the second base station, a request for obtaining the first security capability to a core-network network element, and receiving, by the second base station, the first security capability sent by the core-network network element. The request may be an indication carried in a message, or may be a message itself.

The target base station requests the first security capability from the core-network network element. Because the core-network network element stores complete security capabilities, the core-network network element may send the first security capability to the target base station, so that the target base station obtains the first security capability. The target base station may send the request to a core network via an initial context setup request message, and the second base station may receive the first security capability from the core-network network element via an initial context setup request acknowledgement message, so that the target base station can obtain the first security capability without changing an existing procedure, and there is no need to introduce a new message to carry a first-security-capability request or the first security capability, thereby avoiding an increase in signalling overheads between the target base station and the core-network network element.

Optionally, that the second base station obtains the first security capability includes: receiving, by the second base station, a handover complete message sent by the terminal, where the handover complete message includes the first security capability. Because the terminal stores complete security capabilities, the terminal may send the first security capability to the target base station via the handover complete message, so that the target base station obtains the first security capability without changing the current procedure and without changing the core-network network element, thereby avoiding an increase in signalling overheads between the terminal and the target base station.

Optionally, that the second base station obtains the first security capability includes: receiving, by the second base station, a handover request message sent by the first base station, where the handover request message includes the first security capability and a second security capability of the terminal, and the first security capability is carried in a field that is in the handover request message and that is used to carry the second security capability. The first security capability is carried in the field used to carry the second security capability, so that the first base station can store or send the first security capability even if the first base station cannot identify the first security capability. In this way, the first security capability is not lost during a transfer process between base stations, and the second base station can obtain the first security capability without changing an existing procedure.

Optionally, that the second base station obtains the first security capability includes: receiving, by the second base station, the second security capability that is sent by the first base station and that is supported by the first base station, sending, by the second base station, the second security capability to the core-network network element, and receiving, by the second base station, the first security capability that is sent by the core-network network element when the core-network network element confirms that the second security capability is inconsistent with one or more security capabilities stored by the core-network network element, where the one or more security capabilities stored by the core-network network element includes the first security capability. Because the core-network network element stores complete security capabilities, the core-network network element compares a security capability of the second base station and the one or more security capabilities stored by the core-network network element, so as to learn whether the security capability stored by the second base station is incomplete. The core-network network element may send the first security capability to the second base station, or may send the complete security capabilities to the second base station, for example, the first security capability and the second security capability, so that the second base station obtains the first security capability.

Optionally, the sending, by the second base station, the request for obtaining the first security capability to the core-network network element includes: The second base station receives a security capability sent by the first base station, the second base station determines whether to send, to the core-network network element, the request for obtaining the first security capability, and the second base station sends, to the core-network network element, the request for obtaining the first security capability. The second base station determines whether the security capability received by the second base station is complete. When the security capability received by the second base station is incomplete, for example, does not include the first terminal security capability, the second base station sends a request to the core-network network element. This can prevent the second base station having the first security capability from still sending a request, thereby saving radio resources and improving efficiency.

Optionally, the method further includes: sending, by the second base station, indication information to the first base station, where the indication information is used to instruct the first base station to send the second security capability of the terminal to the terminal; and the receiving, by the second base station, a handover complete message sent by the terminal, where the handover complete message includes the first security capability includes: receiving, by the second base station, the handover complete message that is sent by the terminal when the second security capability sent by the first base station is inconsistent with one or more security capabilities stored by the terminal, where the handover complete message includes the first security capability, and the one or more security capabilities stored by the terminal includes the first security capability and the second security capability. The second base station delivers an indication, so that the first base station sends, to the terminal, the second security capability stored by the first base station, and the terminal compares the second security capability with the one or more security capabilities stored by the terminal. When the second security capability is not the same as the one or more security capabilities stored by the terminal, the terminal sends the first security capability, or the first security capability and the second security capability to the second base station. In this way, the second base station can obtain the first security capability without changing the core-network network element.

Optionally, the method further includes: sending, by the second base station, a secondary base station addition request message to the third base station, where the secondary base station addition request message includes the first security capability; receiving, by the second base station, a secondary base station addition request acknowledgement message sent by the third base station, where the secondary base station addition request acknowledgement message includes an algorithm selected by the third base station based on the first security capability; and sending, by the second base station, the selected algorithm to the terminal. The third base station selects the algorithm of the first security capability, and sends the algorithm to the terminal via the second base station, so that a connection between the terminal and the third base station can be established. Therefore, the dual connections between the terminal and the second base station and the third base station are established.

A second aspect of the embodiments of the present invention provides a communication method. In this method, a terminal is handed over from a first base station not supporting a first security capability to a second base station supporting the first security capability, where the handover is performed via an interface between the first base station and the second base station; and the terminal establishes a connection to a third base station based on the first security capability received by the third base station from the second base station.

Optionally, the method further includes: sending, by the terminal, a handover complete message to the second base station, where the handover complete message includes the first security capability.

Optionally, the sending, by the terminal, a handover complete message to the second base station, where the handover complete message includes the first security capability includes: receiving, by the terminal, a second security capability sent by the first base station, and sending the first security capability when confirming that the second security capability is inconsistent with one or more security capabilities stored by the terminal, where the one or more security capabilities stored by the terminal includes the first security capability and the second security capability.

Optionally, the method further includes: receiving, by the terminal, an algorithm of the first security capability sent by the second base station.

Optionally, in the communication methods in the first aspect and the second aspect, the first security capability is a 5G security capability, and the second security capability is a 4G security capability.

A third aspect of the embodiments of the present invention provides a communication method. In this method, during a handover from a first base station not supporting a first security capability to a second base station supporting the first security capability, the second base station obtains the first security capability, where the handover is performed via an interface between the first base station and the second base station. The second base station may send, to a core-network network element, a request for obtaining the first security capability, and receive the first security capability sent by the core-network network element. The second base station may alternatively receive a handover complete message sent by a terminal, where the handover complete message includes the first security capability. The second base station may alternatively receive a handover request message sent by the first base station to obtain the first security capability, where the handover request message includes the first security capability and a second security capability of the terminal, and the first security capability is carried in a field that is in the handover request message and that is used to carry the second security capability. The second base station may alternatively receive the second security capability that is sent by the first base station and that is supported by the first base station, the second base station sends the second security capability to the core-network network element, and the second base station receives the first security capability that is sent by the core-network network element when the core-network network element confirms that the second security capability is inconsistent with one or more security capabilities stored by the core-network network element, where the one or more security capabilities stored by the core-network network element includes the first security capability.

Optionally, that the second base station sends, to the core-network network element, a request for obtaining the first security capability includes: receiving, by the second base station, a security capability sent by the first base station, determining, by the second base station, whether to send, to the core-network network element, the request for obtaining the first security capability, and sending, by the second base station to the core-network network element, the request for obtaining the first security capability.

Optionally, the second base station sends indication information to the first base station, where the indication information is used to instruct the first base station to send the second security capability of the terminal to the terminal; and that the second base station receives the handover complete message sent by the terminal, where the handover complete message includes the first security capability includes: receiving, by the second base station, the handover complete message sent by the terminal when the second security capability sent by the first base station is inconsistent with one or more security capabilities stored by the terminal, where the handover complete message includes the first security capability, and the one or more security capabilities stored by the terminal includes the first security capability and the second security capability.

The second base station obtains the first security capability, so that a corresponding function of the first security capability can be implemented between the second base station and the terminal, thereby improving user experience.

A fourth aspect of the embodiments of the present invention provides a communication method. In this method:

During a handover from a first base station not supporting a first security capability to a second base station supporting the first security capability, the second base station obtains the first security capability, where the handover is performed via an interface between the first base station and the second base station. For obtaining the first security capability by the second base station, refer to the communication method according to the third aspect in the embodiments of the present invention. The second base station selects a corresponding algorithm based on the first security capability, and sends the algorithm to a terminal. The second base station obtains the first security capability, and the second base station delivers the corresponding algorithm of the first security capability to the terminal. This can improve network security between the terminal and the second base station, reduce a possibility of being attacked or cracked, and ensure user experience.

A fifth aspect of the embodiments of the present invention provides a base station, including a memory and a processor, where the memory is configured to store a computer program, and the processor is configured to invoke the computer program from the memory and run the computer program, so that the base station executes the method according to the first aspect, the third aspect, or the fourth aspect.

A sixth aspect of the embodiments of the present invention provides a terminal, including a memory and a processor, where the memory is configured to store a computer program, and the processor is configured to invoke the computer program from the memory and run the computer program, so that the terminal executes the method according to the second aspect.

A seventh aspect of the embodiments of the present invention provides a communication method. In this method:

During a handover from a first base station not supporting a first security capability to a second base station supporting the first security capability, a core-network network element sends the first security capability to the second base station, where the handover is performed via an interface between the first base station and the second base station. The core-network network element may send the first security capability to the second base station via a path switch request acknowledgement message. In this way, the second base station may obtain the first security capability without changing an existing procedure. Before the core-network network element sends the first security capability to the second base station, the method may further include: receiving, by the core-network network element, an indication used to obtain the first security capability and sent by the second base station, and sending, by the core-network network element, the first security capability according to the indication. Optionally, the indication is included in a path switch request message.

Optionally, before the core-network network element sends the first security capability to the second base station, the core-network network element receives a second security capability sent by the second base station, the core-network network element compares the second security capability with one or more security capabilities stored in the core-network network element, and when the second security capability is inconsistent with the one or more security capabilities stored in the core-network network element, the core-network network element sends the first security capability to the second base station. Optionally, the second security capability is included in the path switch request message. The core-network network element compares the second security capability stored by the second base station with the one or more security capabilities stored in the core-network network element, so that the core-network network element can learn whether a security capability stored by the second base station is incomplete, to send the first security capability to the second base station. Optionally, the first security capability is included in the path switch request acknowledgement message.

The core-network network element sends the first security capability to the second base station, so that the second base station obtains the first security capability. In this way, a corresponding function of the first security capability may be implemented between the second base station and the terminal, thereby improving user experience.

An eighth aspect of the embodiments of the present invention provides a communication method. In this method:

During a handover from a first base station not supporting a first security capability to a second base station supporting the first security capability, the first base station sends a handover request message to the second base station, where the handover request message includes the first security capability and a second security capability, and the first security capability is carried in a field that is in the handover request message and that is used to carry the second security capability. Before the first base station sends the handover request message to the second base station, the first base station may obtain the first security capability and the second security capability by receiving an initial context setup request message sent by a core-network network element, where the initial context setup request message includes the first security capability and the second security capability, and the first security capability is carried in a field that is in the initial context setup request message and that is used to carry the second security capability. Alternatively, before the first base station sends the handover request message to the second base station, for the first base station, a handover may be performed from another base station, for example, a base station not supporting the first security capability, to the first base station. In this case, when the another base station sends a handover request message to the first base station, the handover request message includes the first security capability and the second security capability, and the first security capability is carried in a field that is in the handover request message and that is used to carry the second security capability.

The first security capability is carried in the field used to carry the second security capability, so that the first base station can store the first security capability even if the first base station cannot identify the first security capability. In this way, the first security capability is not lost when transferred between base stations.

A ninth aspect of the embodiments of the present invention provides a core-network network element, including a memory and a processor, where the memory is configured to store a computer program, and the processor is configured to invoke the computer program from the memory and run the computer program, so that the core-network network element executes the method according to the seventh aspect.

A tenth aspect of the embodiments of the present invention provides a base station, including a memory and a processor, where the memory is configured to store a computer program, and the processor is configured to invoke the computer program from the memory and run the computer program, so that the base station executes the method according to the eighth aspect.

An eleventh aspect of the embodiments of the present invention provides a computer storage medium, configured to store a computer software instruction used by the communications apparatus provided in the fifth aspect, where the computer software instruction includes a program designed for executing the first aspect, the third aspect, or the fourth aspect.

A twelfth aspect of the embodiments of the present invention provides a computer storage medium, configured to store a computer software instruction used by the communications apparatus provided in the sixth aspect, where the computer software instruction includes a program designed for executing the second aspect.

A thirteenth aspect of the embodiments of the present invention provides a computer storage medium, configured to store a computer software instruction used by the communications apparatus provided in the fifth aspect, where the computer software instruction includes a program designed for executing the seventh aspect.

A fourteenth aspect of the embodiments of the present invention provides a computer storage medium, configured to store a computer software instruction used by the communications apparatus provided in the sixth aspect, where the computer software instruction includes a program designed for executing the eighth aspect.

A fifteenth aspect of the embodiments of the present invention provides a chip system, where the chip system includes a processor, configured to support a base station in implementing functions in the first aspect, the third aspect, or the fourth aspect. In a possible design, the chip system further includes a memory, and the memory is configured to store a program instruction and data required by a communications apparatus, for example, store data and information in the first aspect, the third aspect, or the fourth aspect. The chip system may include chips, or may include chips and other separate components.

A sixteenth aspect of the embodiments of the present invention provides a chip system, where the chip system includes a processor, configured to support a terminal in implementing functions in the second aspect. In a possible design, the chip system further includes a memory, and the memory is configured to store a program instruction and data necessary for a communications apparatus, for example, store data or information in the second aspect. The chip system may include a chip, or may include a chip and other discrete devices.

A seventeenth aspect of the embodiments of the present invention provides a chip system, where the chip system includes a processor, configured to support a base station in implementing functions in the seventh aspect. In a possible design, the chip system further includes a memory, and the memory is configured to store a program instruction and data necessary for a communications apparatus, for example, store data or information in the seventh aspect. The chip system may include a chip, or may include a chip and other discrete devices.

An eighteenth aspect of the embodiments of the present invention provides a chip system, where the chip system includes a processor, configured to support a core-network network element in implementing functions in the eighth aspect. In a possible design, the chip system further includes a memory, and the memory is configured to store a program instruction and data necessary for a communications apparatus, for example, store data or information in the eighth aspect. The chip system may include a chip, or may include a chip and other discrete devices.

A nineteenth aspect of the embodiments of the present invention provides a communications system, including the base station according to the fifth aspect and the base station according to the ninth aspect.

A twentieth aspect of the embodiments of the present invention provides a communications system, including the base station according to the fifth aspect and the core-network network element according to the tenth aspect.

A twenty-first aspect of the embodiments of the present invention provides a communications system, including the base station according to the fifth aspect, the base station according to the ninth aspect, and the core-network network element according to the tenth aspect.

BRIEF DESCRIPTION OF DRAWINGS

To describe this application more clearly, the following briefly describes the accompanying drawings required for describing the embodiments. Apparently, the accompanying drawings in the following description show only some embodiments of the present invention, and a person of ordinary skill in the art may still derive other drawings from these accompanying drawings without creative efforts.

FIG. 7a is a schematic diagram of another security capability information element according to an embodiment of the present invention;

FIG. 7b is a schematic diagram of another security capability information element according to an embodiment of the present invention;

DESCRIPTION OF EMBODIMENTS

The following describes the technical solutions in this application with reference to the accompanying drawings in this application.

Figure 1:
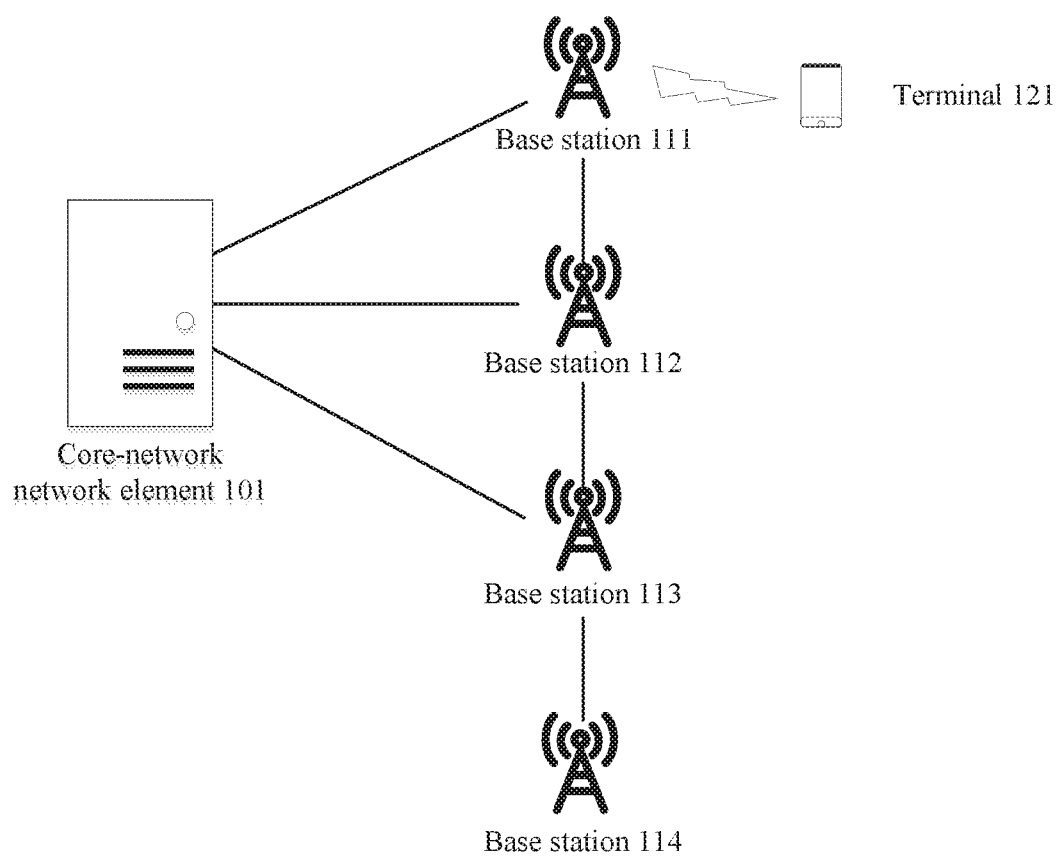
FIG. 1 is a schematic diagram of a communications system according to an embodiment of the present invention.

An embodiment of the present invention provides a communications system, where the communications system may include a core-network network element and a plurality of base stations. When a terminal establishes a connection to at least one base station, the communications system may further include at least one terminal. FIG. 1 is a schematic diagram of a communications system according to an embodiment of the present invention. As shown in FIG. 1, the core-network network element is a core-network network element 101, the plurality of base stations are a base station 111, a base station 112, a base station 113, and a base station 114. The plurality of base stations are connected to the core-network network element, and the plurality of base stations may be connected to each other via interfaces between the base stations. For example, the base station 111, the base station 112, and the base station 113 are connected to the core-network network element 101, the base station 111 is connected to the base station 112 via an interface between the base station 111 and the base station 112, the base station 112 is connected to the base station 113 via an interface between the base station 112 and the base station 113, and the base station 113 is connected to the base station 114 via an interface between the base station 113 and the base station 114. When a terminal 121 communicates with the base station 113, the base station 113 and the base station 114 may establish dual connections to the terminal 121, and at least one of the base station 113 and the base station 114 may be connected to the core-network network element 101. For example, in FIG. 1, the base station 113 is connected to the core-network network element 101. It should be noted that the core-network network element, the base stations, and the terminal included in the communications system shown in FIG. 1 are merely examples, and an interface-based connection relationship between the base stations is also merely an example. In this embodiment of the present invention, types and a quantity of network elements included in the communications system, and a connection relationship between network elements are not limited hereto.

The communications system may be a communications system that supports a fourth generation (fourth generation, 4G) access technology, for example, a Long Term Evolution (long term evolution, LTE) access technology. Alternatively, the communications system may be a communications system that supports a fifth generation (fifth generation, 5G) access technology, for example, a New Radio (new radio, NR) access technology. Alternatively, the communications system may be a communications system that supports a third generation (third generation, 3G) access technology, for example, a Universal Mobile Telecommunications System (universal mobile telecommunications system, UMTS) access technology. Alternatively, the communications system may be a communications system that supports a plurality of wireless technologies, for example, a communications system that supports both the LTE technology and the NR technology. In addition, the communications system may also be applicable to a future-oriented communications technology.

The base station (base station, BS) in this embodiment of the present invention may be a device on an access network side and used for supporting the terminal in accessing the communications system, for example, may be an evolved NodeB (evolved nodeB, eNB), a transmission reception point (transmission reception point, TRP), a relay node (relay node), an access point (access point, AP), or the like. The base station may be a macro base station, a micro base station, a home base station, or the like. An access device may be fixed or mobile.

In the communications system shown in FIG. 1, the base station 111, the base station 112, the base station 113, and the base station 114 may be NodeBs (Node B) in a 3G access technology-based communications system, eNBs in a 4G access technology-based communications system, or next generation NodeBs (next generation nodeB, gNB) or TRPs in a 5G access technology-based communications system. Alternatively, the base stations shown in FIG. 1 may be enhanced base stations in the communications system of an access technology of each generation. A function-enhanced base station that emerges during an evolution process of a radio access technology is still a base station of the access technology of each generation in type, but is upgraded in consideration of progressive deployment, so that the base station has functions of a next-generation access technology. The function-enhanced base station may be referred to as an enhanced base station, a new-type base station, or the like, and this is not limited in this embodiment of the present invention. For ease of description, the function-enhanced base station is referred to as an enhanced base station hereinafter. For example, the base station 11 is a 4G enhanced base station that emerges during a process in which LTE is evolved to NR, the base station 112 is a 4G eNB, the base station 113 is a 4G enhanced base station, and the base station 114 is a 5G gNB. The 4G enhanced base station is still an eNB in type, but has functions of a gNB. An interface between the base stations may be an X2 interface in 4G or an Xn interface in 5G For example, the base station 111 is connected to the base station 112 via an X2 interface, the base station 112 is connected to the base station 113 via an X2 interface, and the base station 113 is connected to the base station 114 via an Xn interface. An interface between a base station and the core-network network element may be an S1 interface in 4G, or an NG interface in 5G For example, the base station 111, the base station 112, and the base station 113 each are connected to the core-network network element 101 via an S1 interface.

In the communications system shown in FIG. 1, the terminal 121 may have a capability of accessing communications systems of different access technologies. For example, the terminal 121 is capable of accessing a 4G communications system, and is also capable of accessing a 5G communications system. The terminal 121 may communicate with the base station 111.

In the communications system shown in FIG. 1, the core-network network element 101 may be a core-network network element in a 4G evolved packet core (evolved packet core, EPC) network, a core-network network element in a 5G core (5G core, 5GC) network, or an enhanced core-network network element that emerges during an evolution process of a radio access technology. The enhanced core-network network element belongs to an access technology of each generation in type, but is upgraded in consideration of progressive deployment, so that the enhanced core-network network element has functions of a next-generation access technology. For example, a 4G enhanced core-network network element that emerges during a process in which LTE is evolved to NR is still an EPC network element in type, but has functions of a 5GC network element. The 4G enhanced core-network network element may be called another name, for example, an enhanced EPC network element, a new-type EPC network element, or the like. This is not limited in this embodiment of the present invention. For example, the core-network network element 101 may be a mobility management entity (mobility management entity, MME) or an enhanced MME in the EPC or the enhanced 4G core network. Alternatively, the core-network network element 101 may be an access and mobility management function (access and mobility management function, AMF) entity or an enhanced AMF in the 5GC.

The terminal in this embodiment of the present invention may also be referred to as user equipment (user equipment, UE), a mobile station (mobile station), a subscriber unit (subscriber unit), a station (station), terminal equipment (terminal equipment, TE), or the like. The terminal may be a cellular phone (cellular phone), a personal digital assistant (personal digital assistant, PDA), a wireless modem (modem), a handheld (handheld) device, a laptop computer (laptop computer), a cordless phone (cordless phone), a wireless local loop (wireless local loop, WLL) station, a tablet computer (pad), or the like. With development of wireless communications technologies, any device that can access a wireless communications network, communicate with a wireless network side, or communicate with another object via a wireless network may be the terminal in this embodiment of the present invention, such as a terminal and a vehicle in intelligent transportation, a home appliance in smart household, an electricity meter reading instrument in a smart grid, a voltage monitoring device, an environment monitoring device, a video surveillance device in an intelligent security network, a cash register, and the like. In this embodiment of the present invention, the terminal may communicate with an access-network device, and a plurality of terminals may communicate with each other. The terminal may be stationary and fixed, or mobile.

In this embodiment of the present invention, different devices, including the terminal and network-side devices such as the base station and the core-network network element, may support different security capabilities, for example, support security capabilities in different wireless communications access technologies. The security capabilities in different wireless communications access technologies may be of different levels. In other words, a security capability in one wireless communications access technology may be higher than a security capability in another wireless communications access technology. For example, a security capability of the 5G communications system is higher than a security capability of the 4G or 3G communications system, and a security capability of the 4G communications system is higher than a security capability of a 3G communications system. A plurality of base stations with different capabilities may support different security capabilities. For example, if one base station has a higher capability than another base station, a security capability supported by the base station is higher than a security capability supported by the another base station. A capability of a base station may be a data processing capability, a load capability, performance, or the like of the base station. A higher capability of a base station may be represented as that the base station provides a higher radio resource throughput, wider radio signal coverage, or more other functions for a terminal, or may be represented as that the base station uses more-cutting-edge wireless communications technologies. This is not limited in this embodiment of the present invention. If a device supports a high-level security capability, the device can also support a low-level security capability. If a device can support only a low-level security capability, the device cannot support a high-level security capability. An algorithm corresponding to the high-level security capability may include an algorithm corresponding to the low-level security capability. For example, the high-level security capability is corresponding to an algorithm 1, an algorithm 2, and an algorithm 3, and the low-level security capability is corresponding to the algorithm 1 and the algorithm 2. In this case, if a device supports the high-level security capability, the device can support the algorithm 1, the algorithm 2, and the algorithm 3 simultaneously; if the device supports the low-level security capability and does not support the high-level security capability, the device supports the algorithm 1 and the algorithm 2, but cannot support the algorithm 3.

Alternatively, the algorithm corresponding to the high-level security capability may not include the algorithm corresponding to the low-level security capability. For example, the high-level security capability is corresponding to an algorithm 1, an algorithm 2, and an algorithm 3, and the low-level security capability is corresponding to an algorithm 4 and an algorithm 5. The algorithm corresponding to the high-level security capability may have better performance than the algorithm corresponding to the low-level security capability, or the algorithm corresponding to the high-level security capability may implement functions of the algorithm corresponding to the low-level security capability. If a device supports the high-level security capability, the device supports the algorithm 1, the algorithm 2, and the algorithm 3, but cannot support the algorithm 4 and the algorithm 5. If the device supports the low-level security capability, the device supports the algorithm 4 and the algorithm 5, but does not support the algorithm 1, the algorithm 2, and the algorithm 3.

For ease of description, the high-level security capability may be referred to as a first security capability, and the low-level security capability may be referred to as a second security capability. In this embodiment of the present invention, with reference to FIG. 1, a security capability that can be supported by the base station 113 but cannot be supported by the base station 112 may be referred to as the first security capability, and a security capability that can be supported by both the base station 112 and the base station 113 may be referred to as the second security capability. The terms "first" and "second" herein are only for distinguishing between security capabilities that can be supported by different devices, and are not intended to impose a specific limitation. For example, the first security capability may be a 5G security capability, and the second security capability may be a 4G security capability.

In the communications system shown in FIG. 1, the terminal 121 supports both the first security capability and the second security capability. For example, the first security capability is a 5G security capability, and the second security capability is a 4G security capability. The base station 111 supports the first security capability and the second security capability. For example, the base station 111 is a 4G enhanced base station, and the base station 111 supports both the 5G security capability and the 4G security capability. The base station 112 supports the second security capability, but does not support the first security capability. For example, the base station 112 is a 4G eNB, and the base station 112 supports the 4G security capability, but does not support the 5G security capability. The base station 113 supports the first security capability and the second security capability. For example, the base station 113 is a 4G enhanced base station, and the base station 111 supports both the 5G security capability and the 4G security capability. The base station 114 supports the first security capability. For example, the base station 114 is a 5G NR base station, and the base station 114 supports the 5G security capability. The core-network network element 101 supports the first security capability and the second security capability. For example, the core-network network element 101 is an enhanced EPC network element, and the core-network network element 101 supports the 5G security capability and the 4G security capability.

The "support" herein may be construed as "identify". To be specific, that a device supports a security capability may be construed as that the device is capable of identifying the security capability. For example, the terminal 121 supports the 5G security capability and the 4G security capability, and the terminal can identify the 5G security capability and the 4G security capability. The base station 111 is a 4G enhanced base station, the base station 111 supports both the 5G security capability and the 4G security capability, and the base station 111 can identify the 5G security capability and the 4G security capability. The base station 112 is a 4G eNB, the base station 112 supports the 4G security capability, but does not support the 5G security capability, and the base station 112 can identify the 4G security capability, but cannot identify the 5G security capability. Alternatively, that a device supports a security capability may be construed as that the device has a capability to use an algorithm corresponding to the security capability, such as performing encryption and integrity protection in communication by using the algorithm. Alternatively, that a device supports a security capability may be construed as that the device has a capability of dual connectivity.

The security capability in this embodiment of the present invention may be a security algorithm. During interaction between the base station, the terminal, and the core-network network element, the security capability may be represented by using a security algorithm identifier. The security algorithm may be represented by using an algorithm identifier, the algorithm identifier may indicate the algorithm, and the device may determine a corresponding algorithm based on the algorithm identifier. Therefore, according to a different requirement of technical description, the security capability, the security algorithm, and the security algorithm identifier may replace each other. This is not limited in this embodiment of the present invention.

The following is a security capability information element design used to carry security capabilities in different messages according to an embodiment of the present invention.

By using the security capability information element, the first security capability and the second security capability are stored in different fields in messages such as an attach request (attach request) message, a tracking area update request (tracking area update request) message, an RRC connection reconfiguration (radio resource control connection reconfiguration) complete message, a handover request (handover request) message, an initial context setup request (initial context setup request) message, a path switch request (path switch request) message, a path switch request acknowledgement (path switch request acknowledgement) message, and the like. When a base station supports a security capability, the base station can identify the security capability in a message, and store the security capability in the base station. For example, the base station 111 supports the first security capability and the second security capability, and the base station 111 can identify the first security capability and the second security capability in the message, and store the first security capability and the second security capability. The base station 112 supports only the second security capability, and does not support the first security capability, the base station 112 can identify only the second security capability in a message and store the second security capability, but cannot identify the first security capability, nor store the first security capability.

Figures 2A, 2B:
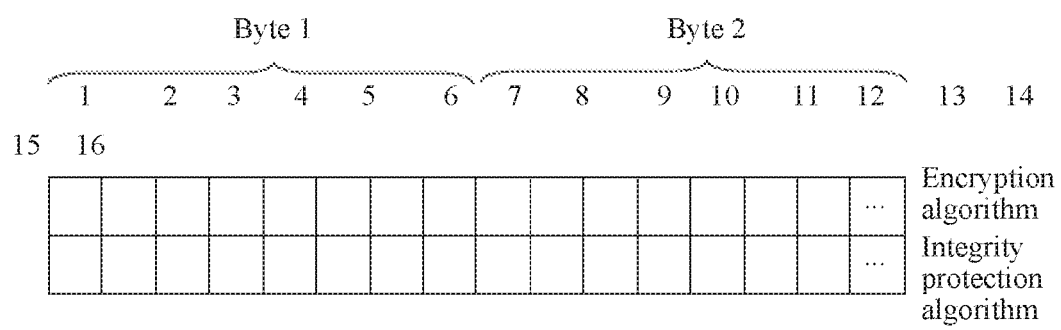
FIG. 2a is a schematic diagram of a security capability information element according to an embodiment of the present invention.
FIG. 2b is a schematic diagram of a security capability information element according to an embodiment of the present invention.

As shown in FIG. 2a, FIG. 2a shows a security capability information element carried in a message between a terminal and a base station or in a message between the terminal and a core network according to an embodiment of the present invention.

The message between the terminal and the base station may be an RRC connection reconfiguration complete message, and the RRC connection reconfiguration complete message may be a handover complete (handover complete) message.

The message between the terminal and the core network may be an attach request message or a tracking area update request message.

The following uses a 4G security capability and a 5G security capability as examples for description. It should be noted that the method is similarly applicable to other security capabilities, and this is not limited in this embodiment of the present invention.

Both the 4G security capability and the 5G security capability may include an encryption algorithm and an integrity protection algorithm. Space of one or more bits needs to be reserved for storing the encryption algorithm or the integrity protection algorithm. It should be noted herein that stored information may not be one or more algorithms themselves, and may be one or more identifiers representing one or more algorithms instead.

A length of a security capability is several bytes, where a byte 1 represents a name of the security capability information element, and a byte 2 represents a length of security capability content. A byte 3 and a byte 4 are used to store the 5G security capability, for example, the byte 3 is used to store the encryption algorithm of the 5G security capability, and the byte 4 is used to store the integrity protection algorithm of the 5G security capability. The byte 4 and a byte 5 are used to store the 5G security capability, where the byte 4 is used to store the encryption algorithm of the 4G security capability, and the byte 5 is used to store the integrity protection algorithm of the 5G security capability. For example, when a bit 8 in the byte 4 is 1, it indicates that an evolved packet system (evolved packet system, EPS) encryption algorithm (EPS encryption algorithm, EEA) 0 is supported. When a bit 7 in the byte 4 is 1, it indicates that an EPS encryption algorithm EEA1 is supported. When a bit 8 in the byte 5 is 1, it indicates that an EPS integrity protection algorithm (EPS integrity algorithm, EIA) 0 is supported.

As shown in FIG. 2*b*, FIG. 2*b* shows a security capability information element carried in a message between a base station and a core network or in a message between base stations according to an embodiment of the present invention.

The message between the base station and the core network may include an initial context setup request message and a path switch request acknowledgement message.

The message between base stations may include a handover request message.

The following uses a 4G security capability and a 5G security capability as examples for description. It should be noted that the method is similarly applicable to other security capabilities, and this is not limited in this embodiment of the present invention.

Both the 4G security capability and the 5G security capability may include an encryption algorithm and an integrity protection algorithm. Space of one or more bits needs to be reserved for storing the encryption algorithm or the integrity protection algorithm. It should be noted herein that stored information may not be one or more algorithms themselves, and may be one or more identifiers representing one or more algorithms instead.

Space for a 5G encryption algorithm is several bits (bit), where each bit value represents an encryption algorithm. A combination of bit values at different positions may be used to represent one or more corresponding encryption algorithms supported. For example, when all bits are all Os, it represents that only a 5G encryption algorithm 1 is supported. The encryption algorithm 1 is a null algorithm. When all bits are Os, it represents that only the 5G encryption algorithm 1 is supported; when another bit is 1, the 5G encryption algorithm 1 is also supported in this case. For example, when a first bit is 1, it represents that a 5G encryption algorithm 2 and the 5G encryption algorithm 1 are supported; when a third bit is 1, it represents that a 5G encryption algorithm 3 and the 5G encryption algorithm 1 are supported. A value of each of other bits may represent an encryption algorithm. Details are not repeated herein.

Space for a 5G integrity protection algorithm is several bits, where each bit value represents an integrity protection algorithm. A combination of bit values at different positions may be used to represent one or more corresponding integrity protection algorithms supported. For example, when 16 bits are all Os, it represents that only a 5G integrity protection algorithm 1 is supported. The integrity protection algorithm 1 is a null algorithm. When all bits are all Os, it represents that only the 5G integrity protection algorithm 1 is supported; when another bit is 1, the 5G integrity protection algorithm 1 is also supported in this case. For example, when a first bit is 1, it represents that a 5G integrity protection algorithm 2 and the 5G integrity protection algorithm 1 are supported; when a third bit is 1, it represents that a 5G integrity protection algorithm 3 and the 5G integrity protection algorithm 1 are supported. A value of each of other bits may represent an integrity protection algorithm. Details are not repeated herein.

Space for a 4G encryption algorithm is several bits (bit), where each bit value represents an encryption algorithm. When all bits are Os, it represents that only an EEA0 algorithm is supported; when a first bit is 1, it represents that an EEA1 algorithm is supported; when a second bit is 1, it represents that an EEA2 algorithm and the EEA0 algorithm are supported; and when a third bit is 1, it represents that an EEA3 algorithm and the EEA0 algorithm are supported. Other bits are reserved for future use.

Figure 3:
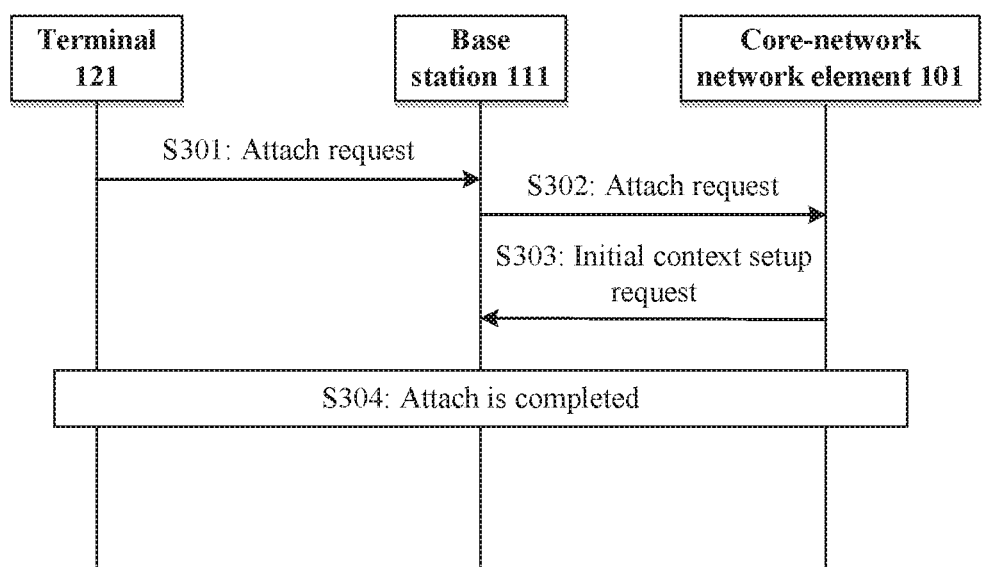
FIG. 3 is a flowchart of an attach method according to an embodiment of the present invention.

With reference to the related content about the security capability information element in FIG. 2*a* and FIG. 2*b*, the following describes a method for obtaining a security capability according to an embodiment of the present invention based on FIG. 3. In this method, a terminal 121 establishes a connection to a base station 111 to access a network initially, and a core-network network element 101 or the base station 111 obtains a first security capability.

S301 to S303 are steps in which the core-network network element 101 obtains the first security capability.

S301: The terminal 121 sends an attach request message to the base station 111.

The terminal 121 stores complete security capabilities of the terminal 121, where the complete security capabilities may include the first security capability and a second security capability.

The attach request message may include the first security capability and the second security capability of the terminal 121, for example, a 4G security capability and a 5G security capability.

For example, for the 4G security capability and the 5G security capability included in the attach request message, refer to the related content about the security capability information element in FIG. 2*a*.

S302: The base station 111 sends the attach request message to the core-network network element 101. The attach request message may include the complete security capabilities of the terminal 121 in S301.

The base station 111 sends, to the core-network network element 101, the received complete security capabilities sent by the terminal 121, where the complete security capabilities may include the first security capability and the second security capability, for example, the 4G security capability and the 5G security capability. For example, for the 4G security capability and the 5G security capability included in the attach request message, refer to the related content about the security capability information elements in FIG. 2a and FIG. 2b.

After the core-network network element 101 receives the attach request message, because the core-network network element 101 supports the complete security capabilities, the core-network network element 101 may identify and store the first security capability and the second security capability.

S303: The core-network network element 101 sends an initial context setup request message to the base station 111.

The initial context setup request message includes the complete security capabilities stored in the core-network network element 101, and may include the first security capability and the second security capability, for example, the 4G security capability and the 5G security capability.

For example, for the 4G security capability and the 5G security capability included in the initial context setup request message, refer to the related content about the security capability information elements in FIG. 2a and FIG. 2b.

After the base station 111 receives the initial context setup request message, because the base station 111 supports the first security capability and the second security capability, the base station 111 may identify and store the first security capability and the second security capability.

S304: Attach is completed.

It should be noted that the core-network network element 101 may obtain the first security capability in the attach process in FIG. 3, and in addition the core-network network element 101 may alternatively obtain the first security capability in a tracking area update process. The terminal 121 sends a tracking area update (tracking area update, TAU) request to the base station 111, and the base station 111 sends the TAU request to the core-network network element 101. For details, refer to the related content in S301 and S302. Details are not repeated herein.

A procedure in FIG. 3 may similarly be applicable to a case in which a base station 112 obtains a security capability when the terminal 121 initially accesses a network, and establishes a connection to the base station 112. A difference lies in that, in S304, the core-network network element sends the initial context setup request message to the base station 112, and the base station 112 may identify and store the second security capability in the initial context setup request message, for example, the base station 112 identifies and stores the 4G security capability, because the base station 112 supports the second security capability, and does not support the first security capability. Because the base station 112 does not support the first security capability, the base station 112 cannot identify the first security capability in the initial context setup request message, and does not have a corresponding field to store the first security capability. As a result, the first security capability is lost.

In the communications system shown in FIG. 1, when the terminal 121 initially accesses the network, the terminal 121 may be connected to the base station 111, then handed over to the base station 112 based on an X2 interface between the base station 11 and the base station 112, and then handed over to the base station 113 based on an Xn interface between the base station 112 and the base station 113. In this case, during the handover from the base station 111 to the base station 112, the base station 111 sends, to the base station 112, the first security capability and the second security capability stored by the base station 111. When the terminal 121 initially accesses the network, the terminal 121 may alternatively be connected to the base station 112, and then handed over to the base station 113 based on the Xn interface between the base station 112 and the base station 113. In this case, the core-network network element 101 sends, to the base station 112, the first security capability and the second security capability stored by the core-network network element 101. In this embodiment of this application, a process in which a terminal is handed over from one base station to another base station via an X2 interface or an Xn interface may also be referred to as an X2 handover or an Xn handover.

Based on the related content in FIG. 3, because the base station 112 does not support the first security capability and supports the second security capability, after receiving the first security capability and the second security capability, the base station 112 can identify and store the second security capability, but cannot identify and store the first security capability, thereby losing the first security capability. During a handover from the base station 112 to the base station 113, when the base station 112 sends, to the base station 113, a security capability stored by the base station 112, the base station 112 sends the second security capability, and therefore the base station 113 cannot obtain the first security capability. In this case, a function brought by the first security capability cannot be implemented between the base station 113 and the terminal 121.

For example, after the terminal 121 is handed over to the base station 113, a radio resource throughput or a data transmission rate of the base station 113 still cannot meet a requirement of the terminal 121. If the base station 113 can obtain the first security capability, the terminal 121 may establish dual connections to the base station 113 and the base station 114. The terminal 121 may use radio resources of the base station 113 and the base station 114, thereby increasing the radio resource throughput. However, because the base station 113 cannot obtain the first security capability, the dual connections cannot be established for the UE. Consequently, the data transmission rate of the terminal cannot be improved, thereby affecting user experience.

For another example, if the terminal 121 and the base station 113 negotiate to use an algorithm corresponding to the first security capability, network security for communication between the terminal 121 and the base station 113 can be improved, and a possibility of being attacked or cracked can be reduced. However, because the base station 113 cannot obtain the first security capability, the terminal 121 and the base station 113 cannot use the algorithm corresponding to the first security capability. In view of the foregoing problem, an embodiment of the present invention provides the following solution, so that the base station 113 can obtain the first security capability when the security capability information elements in FIG. 2a and FIG. 2b are used.

Figure 4:
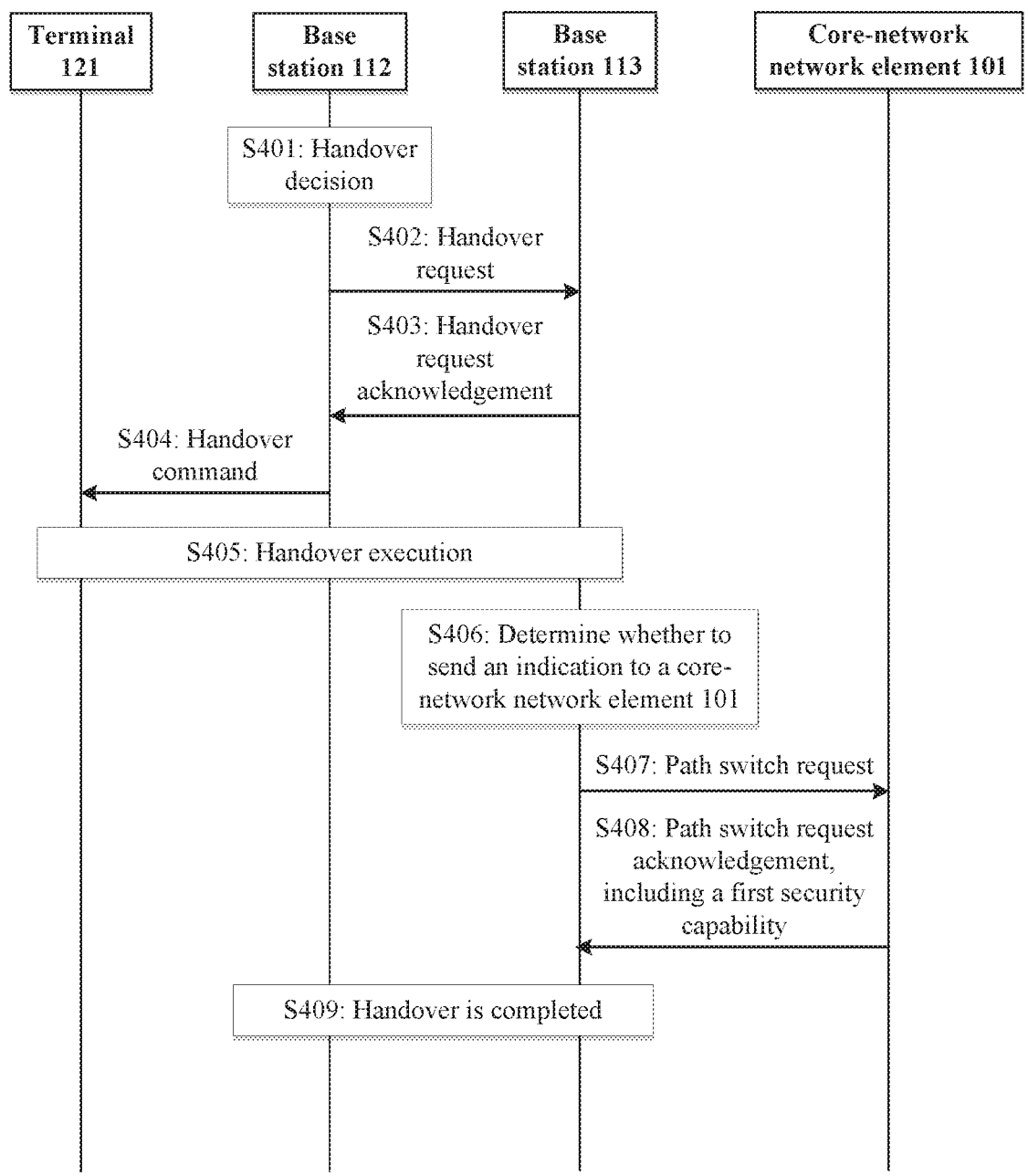
FIG. 4 is a flowchart of a method for obtaining a first security capability according to an embodiment of the present invention.

With reference to the related content in FIG. 3, the following describes a method for obtaining a security capability according to an embodiment of the present invention based on FIG. 4. In this method, a terminal 121 is handed over from a base station 112 to a base station 113, and the base station 113 can obtain a first security capability.

S401: The base station 112 makes handover decision and decides to hand over the terminal 121 from the base station 112 to the base station 113.

S402: The base station 112 sends a handover request message to the base station 113.

Before sending the handover request message, the base station 112 stores a second security capability. Refer to the related content in FIG. 3.

The handover request message includes the second security capability stored in the base station 112. Refer to the related content in FIG. 2b.

After the base station 113 receives the handover request message, because the base station 113 supports a first security capability and the second security capability, the base station 113 can identify and store the second security capability, for example, a 4G security capability, in the handover request message.

S403: The base station 113 sends a handover request acknowledgement message to the base station 112.

The base station 113 selects an integrity protection algorithm and an encryption algorithm that coexist both in the second security capability and in a configuration list of the base station 113, and that have a highest priority, adds identifiers of the algorithms to the handover request acknowledgement message, and sends the handover request acknowledgement message to the base station 112.

S404: The base station 112 sends a handover command message to the terminal 121.

After the terminal 121 receives the algorithm identifiers, the terminal 121 may use the algorithms indicated by the algorithm identifiers, and use algorithms that are negotiated between the terminal 121 and the base station 113 in subsequent communication.

S405: The terminal 121, the base station 112, and the base station 113 complete the handover execution steps.

S406: The base station 113 determines whether to send an indication to a core-network network element 101, where the indication is used to obtain the first security capability.

Optionally, because the base station 113 is connected to the base station 112 via an X2 interface, the base station 113 may learn whether the base station 112 has a lower capability than the base station 113. When the base station 112 has a lower capability than the base station 113, the base station 112 may consider that the capability obtained by the base station 112 is incomplete, and determines to send, to the core-network network element 101, the indication used to obtain the first security capability.

Optionally, because the base station 113 supports the first security capability and the second security capability, the base station 113 may determine whether the security capability received from the base station 112 includes the first security capability. When the security capability received from the base station 112 does not include the first security capability, the base station 113 determines to send, to the core-network network element 101, the indication used to obtain the first security capability. For example, the handover request message received by the base station 113 in S402 includes the second security capability, but does not include the first security capability. The base station 113 determines to send, to the core-network network element 101, the indication used to obtain the first security capability.

Optionally, the indication may be used to obtain complete security capabilities, including the first security capability and the second security capability.

Optionally, the indication may be a request used to request the core network 101 to send the first security capability to the base station 113.

S407: The base station 113 sends, to the core-network network element 101, a path switch request message including the indication in S406.

Optionally, the path switch request message itself can be an indication used to enable the core-network network element 101 to send the first security capability to the base station 113.

Optionally, the path switch request message can carry indication information used to enable the core-network network element 101 to send the first security capability to the base station 113.

The indication is carried in the path switch request message, so that without changing an existing procedure, a requirement that the base station 113 needs to obtain the security capability is informed to the core-network network element 101, and the core-network network element 101 may take a corresponding action according to the indication.

S408: The core-network network element 101 sends a path switch request acknowledgement message to the base station 113, where the path switch request acknowledgement message includes the first security capability.

The core-network network element 101 sends the first security capability to the base station 113 according to the indication.

The path switch request acknowledgement message includes the first security capability. Refer to the related content in FIG. 2b.

Optionally, when the indication is used to obtain the complete security capabilities, the core-network network element 101 sends the first security capability and the second security capability to the base station 113.

The core-network network element 101 sends the first security capability to the base station 113 via the path switch request acknowledgement message, so that the base station 113 can obtain the first security capability without changing the existing procedure, and there is no need to introduce a new message to transfer the first security capability, thereby avoiding an increase in signalling overheads between the base station 113 and the core-network network element.

S409: The handover is completed.

According to this method, the base station 113 determines whether a security capability obtained by the base station 113 is likely incomplete, to determine whether to send the indication to the core-network network element 101, so that the core-network network element 101 sends, to the base station 113, the one or more security capabilities stored by the core-network network element 101, and the base station 113 can obtain the first security capability without changing the existing procedure. In this way, more functions can be implemented between the base station 113 and the terminal after the base station 113 obtains the first security capability, thereby improving user experience.

Figure 5:
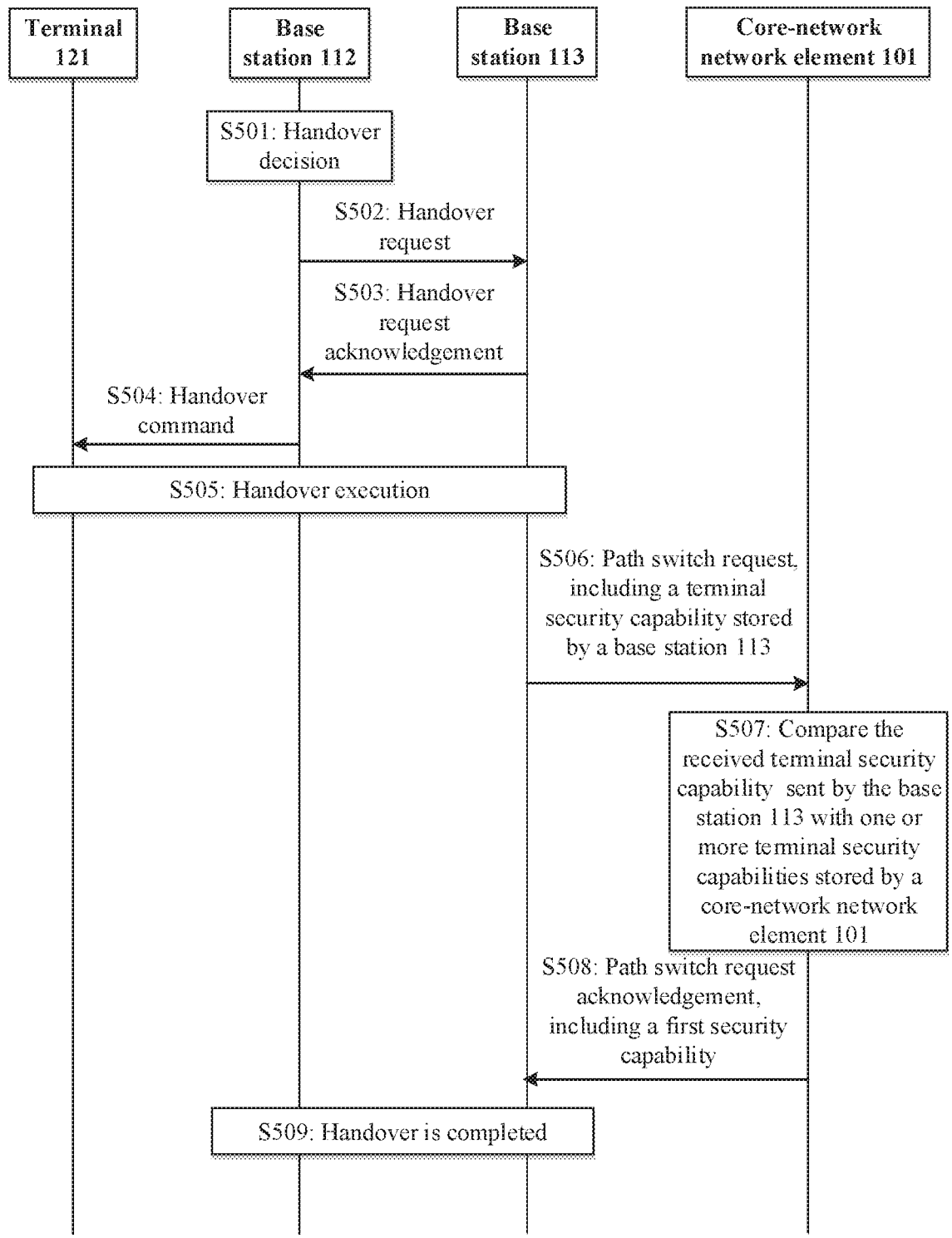
FIG. 5 is a flowchart of another method for obtaining a first security capability according to an embodiment of the present invention.

With reference to FIG. 5, the following describes another method for handing over a terminal 121 from a base station 112 to a base station 113, so that the base station 113 can obtain a first security capability according to an embodiment of the present invention. For S501 to S505, refer to the related content in S401 to S405. Details are not repeated herein.

S501: The base station 112 makes handover decision and decides to hand over the terminal 121 from the base station 112 to the base station 113.

S502: The base station 112 sends a handover request message to the base station 113.

S503: The base station 113 sends a handover request acknowledgement message to the base station 112.

S504: The base station 112 sends a handover command message to the terminal 121.

S505: The terminal 121, the base station 112, and the base station 113 complete the handover execution steps.

S506: The base station 113 sends a path switch request message to a core-network network element 101. The path switch request message includes a security capability stored by the base station 113, such as a second security capability.

S507: The core-network network element 101 compares the received security capability sent by the base station 113 with one or more security capabilities, such as a first security capability and the second security capability, stored by the core-network network element 101 itself.

When a comparison result is inconsistency, the core-network network element 101 determines to send, to the base station 113, the one or more security capabilities stored in the core-network network element 101 to the base station 113, or the core-network network element 101 sends the first security capability that the base station 113 does not have. When a comparison result is consistency, the core-network network element 101 performs no processing. For example, the core-network network element 101 stores the first security capability and the second security capability, and the received path switch request message includes only the second security capability. The core-network network element 101 makes a comparison and finds inconsistency. The core-network network element 101 determines to send, to the base station 113, the first security capability and the second security capability stored by the core-network network element 101 itself, or the first security capability that the base station 113 does not have.

Optionally, when the comparison result is inconsistency, the core-network network element 101 may make a local record, or take another operation, for example, sending a warning.

S508: The core-network network element 101 sends a path switch request acknowledgement message to the base station 113, including the first security capability.

The path switch request acknowledgement message includes the first security capability. Refer to the related content in FIG. 2b.

Optionally, the path switch request acknowledgement message includes the first security capability and the second security capability stored by the core-network network element 101, for example, a 5G security capability and a 4G security capability.

The first security capability is carried in the path switch request acknowledgement message, so that the base station 113 can obtain the first security capability, thereby avoiding an increase in signalling overheads between the base station 113 and the core-network network element.

S509: The handover is completed.

According to this method, the core-network network element 101 compares the received security capability of the base station 113 with the one or more security capabilities stored by the core-network network element 101 itself, the core network determines whether the security capability obtained by the base station 113 may be incomplete, and determines to add, to the path switch request acknowledgement message, the one or more security capabilities stored by the core-network network element 101. In this way, the base station 113 can obtain the first security capability without changing an existing procedure. More functions can be implemented between the base station 113 and the terminal after the base station 113 obtains the first security capability, thereby improving user experience.

Figure 6:
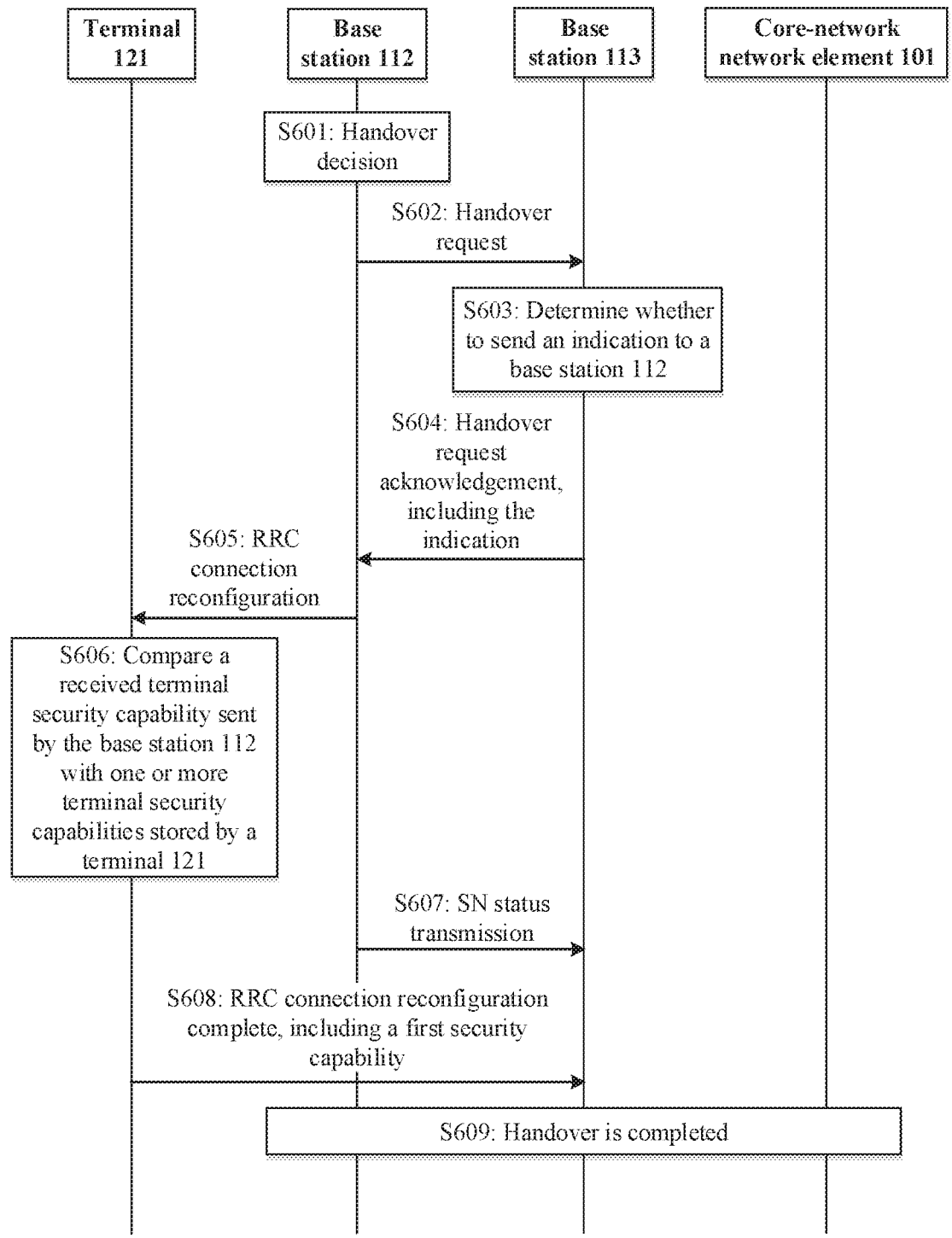
FIG. 6 is a flowchart of another method for obtaining a first security capability according to an embodiment of the present invention.

With reference to FIG. 6, the following describes another method for handing over a terminal 121 from a base station 112 to a base station 113, so that the base station 113 can obtain a first security capability according to an embodiment of the present invention.

S601: The base station 112 makes handover decision and decides to hand over the terminal 121 from the base station 112 to the base station 113.

S602: The base station 112 sends a handover request message to the base station 113.

The handover request message includes a second security capability. Refer to the related content in FIG. 2b.

Before the base station 112 sends the handover request message to the base station 113, the base station 112 already stores the second security capability. For details, refer to the related descriptions in S402 in FIG. 4. Details are not repeated herein.

After the base station 113 receives the handover request message, the base station 113 stores the second security capability. For details, refer to the related descriptions in S402 in FIG. 4. Details are not repeated herein.

S603: The base station 113 determines whether to send an indication to the base station 112. The indication is used to enable the base station 112 to send, to the terminal 121, a terminal capability stored in the base station 112.

Optionally, because the base station 113 is connected to the base station 112 via an X2 interface, the base station 113 may learn whether the base station 112 has a lower capability than the base station 113. When the base station 112 has a lower capability than the base station 113, the base station 113 may determine to send the indication to the base station 112.

Optionally, because the base station 113 supports the first security capability and the second security capability, the base station 113 may determine whether the security capability received from the base station 112 includes the first security capability and the second security capability. When the security capability received from the base station 112 does not include the first security capability or the second security capability, the base station 113 determines to send the indication to the base station 112. For example, the handover request message received by the base station 113 in S602 includes the second security capability, but does not include the first security capability. The base station 113 determines to send the indication to the base station 112.

Optionally, the indication may be a request, used to request the base station 112 to send, to the terminal 121, one or more terminal capability stored in the base station 112.

S604: The base station 113 sends a handover request acknowledgement message to the base station 112. The handover request acknowledgement message includes the indication in S603.

S605: The base station 112 sends a radio resource control (radio resource control, RRC) connection reconfiguration message to the terminal 121, where the RRC connection reconfiguration message includes a security capability stored by the base station 112.

After receiving the handover request acknowledge message, the base station 112 sends the security capability stored by the base station 112, for example, the second security capability, according to the indication in the handover request acknowledge message.

The RRC connection reconfiguration message includes the second security capability. Refer to the related content in FIG. 2b. The RRC connection reconfiguration message may be a handover command message.

S606: The terminal 121 compares the received security capability sent by the base station 112 with one or more security capabilities stored by the terminal 121 itself.

The terminal 121 stores complete security capabilities, which may include the first security capability and the second security capability.

When a comparison result is inconsistency, the terminal 121 determines to send, to the base station 113, the one or more security capabilities stored in the terminal 121, or the terminal 121 sends, to the base station 113, the first security capability that the base station 112 does not have. When a comparison result is consistency, a core-network network element 101 performs no processing. For example, the one or more security capabilities stored by the terminal 121 includes the first security capability and the second security capability, and the received handover command message includes only the second security capability. The terminal 121 makes a comparison and finds inconsistency. The terminal 121 determines to send, to the base station 113, the first security capability and the second security capability stored by the terminal 121 itself, or the first security capability that the base station 113 does not have.

To reflect integrity of a procedure, S607 shows a step of transmitting an SN status between the base station 112 and the base station 113.

S607: The base station 112 transmits an SN status to the base station 113.

S608: The terminal 121 sends, to the base station 113, an RRC connection reconfiguration complete message, including the first security capability.

When the terminal 121 determines to send, to the base station 113, the one or more security capabilities stored in the terminal 121, the RRC connection reconfiguration complete message carries the one or more security capabilities stored in the terminal 121, such as the first security capability and the second security capability.

When the terminal 121 determines to send the first security capability to the base station 113, the RRC connection reconfiguration complete message carries the first security capability stored in the terminal 121.

The RRC connection reconfiguration complete message includes a 4G security capability and a 5G security capability. Refer to the related content in FIG. 2b.

S609: The handover is completed.

Optionally, the method may not include step S603, and the handover request acknowledgement message in S604 may not include the indication. In this design, the base station 112 may determine, based on a strategy of the base station 112 itself, such as a configuration of an operator, whether to send, to the terminal 121, the security capability stored by the base station 112 itself.

Optionally, the method may not include step S603, the handover request message in S604 may not include the indication, the RRC connection reconfiguration message in S605 may not include the security capability stored by the base station 112, and the method may not include step S606. The terminal 121 may determine, based on a strategy of the terminal 121 itself, such as a configuration of the terminal 121, whether to send, to the base station 113, the one or more security capabilities stored by the terminal 121. In this way, the base station 113 may obtain the first security capability without changing an existing procedure and the core-network network element.

For the security capability information elements described in FIG. 2a and FIG. 2b, because the second security capability may be lost during a message transfer process between base stations, an embodiment of the present invention further provides another security capability information element, so that the second security capability is not lost during the message transfer process between the base stations.

In the another security capability information element, a first security capability in a message is placed in a field of a second security capability. When a base station does not support the first security capability, but supports the second security capability, the base station can also read the first security capability and the second security capability from the message. For example, a base station 112 supports only the second security capability, and does not support the first security capability, and the base station 112 can also read the first security capability and the second security capability from the message. In this way, in the message transfer process between the base stations, even if the base station 112 does not support the second security capability, the base station 112 can still read the second security capability, so as to ensure that the second security capability is not lost and ensure that a base station 113 obtains the first security capability.

With reference to FIG. 7a and FIG. 7b, the following describes another security capability information element according to an embodiment of the present invention.

As shown in FIG. 7a. FIG. 7a shows a security capability information element carried in a message between a terminal and a base station or in a message between the terminal and a core network according to an embodiment of the present invention.

The message between the terminal and the base station may be an RRC connection reconfiguration complete message.

The message between the terminal and the core network may be an attach request message or a tracking area update request message.

The following uses a 4G security capability and a 5G security capability as examples for description. It should be noted that the method is similarly applicable to other security capabilities, and this is not limited in this embodiment of the present invention.

Both the 4G security capability and the 5G security capability may include an encryption algorithm and an integrity protection algorithm. Space of one or more bits needs to be reserved for storing the encryption algorithm or the integrity protection algorithm. It should be noted herein that stored information may not be one or more algorithms themselves, and may be one or more identifiers representing one or more algorithms instead.

A byte 1 represents a name of the security capability information element, and a byte 2 represents a length of security capability content. A byte 3 and a byte 4 are used to store the 4G security capability, where the byte 3 is used to store the encryption algorithm of the 4G security capability, and the byte 4 is used to store the integrity protection algorithm of the 4G security capability. For example, when a bit 8 in the byte 3 is 1, it indicates that an evolved packet system (Evolved Packet System. EPS) encryption algorithm (EPS encryption algorithm, EEA) 0 is supported; when a bit 7 in the byte 3 is 1, it indicates that an EPS encryption algorithm EEA1 is supported; when a bit 8 in the byte 4 is 1, it indicates that an EPS integrity protection algorithm (EPS integrity algorithm, EIA) 0 is supported.

It can be learned from FIG. 7a that the byte 3 and the byte 4 each merely use 4 bits, namely, a bit 5 to the bit 8, and a bit 1 to a bit 4 are null. The 5G security capability may be stored in the byte 3 and the byte 4, where the encryption algorithm of the 5G security capability is stored in the bit 1 to the bit 4 of the byte 3, and the integrity protection algorithm of the 5G security capability is stored in the bit 1 to the bit 4 of the byte 4.

By using information element design, a terminal 121 sends an attach request or a tracking area update request message to a core-network network element 101 when initially accessing a network or updating a location. In this way, the core-network network element 101 may obtain the 5G security capability, without adding a new 5G security capability information element.

As shown in FIG. 7*b*, FIG. 7*b* shows a security capability information element carried in a message between a base station and a core network or in a message between base stations according to an embodiment of the present invention.

The message between the base station and the core network may include an initial context setup request message or a path switch request acknowledgement message.

The message between the base stations may include a handover request message.

The following uses a 4G security capability and a 5G security capability as examples for description. It should be noted that the method is similarly applicable to other security capabilities, and this is not limited in this embodiment of the present invention.

Both the 4G security capability and the 5G security capability may include an encryption algorithm and an integrity protection algorithm. Space of one or more bits needs to be reserved for storing the encryption algorithm or the integrity protection algorithm. It should be noted herein that stored information may not be one or more algorithms itself, and may be one or more identifiers representing one or more algorithms instead.

A 16-bit character string is defined separately for the encryption algorithm and the integrity protection algorithm of the 4G security capability. For example, for the encryption algorithm, a bit value at each position represents an encryption algorithm. For example, when the bit value at each position is 1, it represents that a corresponding encryption algorithm is supported; when the bit value at each position is 0, it represents that the corresponding encryption algorithm is not supported. When all bits are Os, it represents that only an EEA0 algorithm is supported; when a first bit is 1, it represents that an EEA1 algorithm is supported: when a second bit is 1, it represents that an EEA2 algorithm is supported; and when a third bit is 1, it represents that an EEA3 algorithm is supported. A fourth bit to a sixteenth bit are reserved for future use. Similar to the encryption algorithm, for the integrity protection algorithm, when all bits are Os, it represents that only an EIA0 algorithm is supported; a first bit to a third bit respectively represents that an EIA1, an EIA2, and an EIA3 algorithms are supported; and a fourth bit to a sixteenth bit are reserved for future use.

It can be learned from FIG. 7*b* that in the 16-bit character string separately for the encryption algorithm and the integrity protection algorithm of the 4G security capability, only three bits are used, and other bits are empty. The encryption algorithm of the 5G security capability may be stored in the fourth bit to the sixteenth bit of the encryption algorithm of the 4G security capability. For example, when a ninth bit is 1, it represents that an NEA (next generation encryption algorithm) 1 is supported. This is not limited herein. The integrity protection algorithm of the 5G security capability may be stored in the fourth bit to the sixteenth bit of the integrity protection algorithm of the 4G security capability.

For example, when a ninth bit is 1, it represents that an NIA (next generation integrity algorithm) 1 is supported. This is not limited herein.

When a second information element carrying the first security capability and the second security capability in the initial context setup request message is used, refer to FIG. 3:

The base station 111 in FIG. 3 may be replaced with the base station 112. When the terminal 121 establishes a connection to the base station 112 when initially accessing the network, or when the terminal 121 performs a location update after establishing the connection to the base station 112, the core-network network element 101 sends an initial context setup request message to the base station 112. According to this method, even if the base station 112 does not support the 5G security capability, the base station 112 can still obtain the 5G security capability, without adding a new 5G security capability information element. For example, because the base station 112 supports the 4G security capability, but does not support the 5G security capability, the base station 112 cannot identify or store the 5G security capability. However, the base station 112 has a corresponding field to save the 4G security capability in the initial context setup request message or the handover request message. Because the 5G security capability is also stored in the 4G security capability information element of the initial context setup request message, when the base station 112 saves the 4G security capability in the initial context setup request message, the 5G security capability may be simultaneously stored in the field of the 4G security capability of the base station 112.

Figure 8:
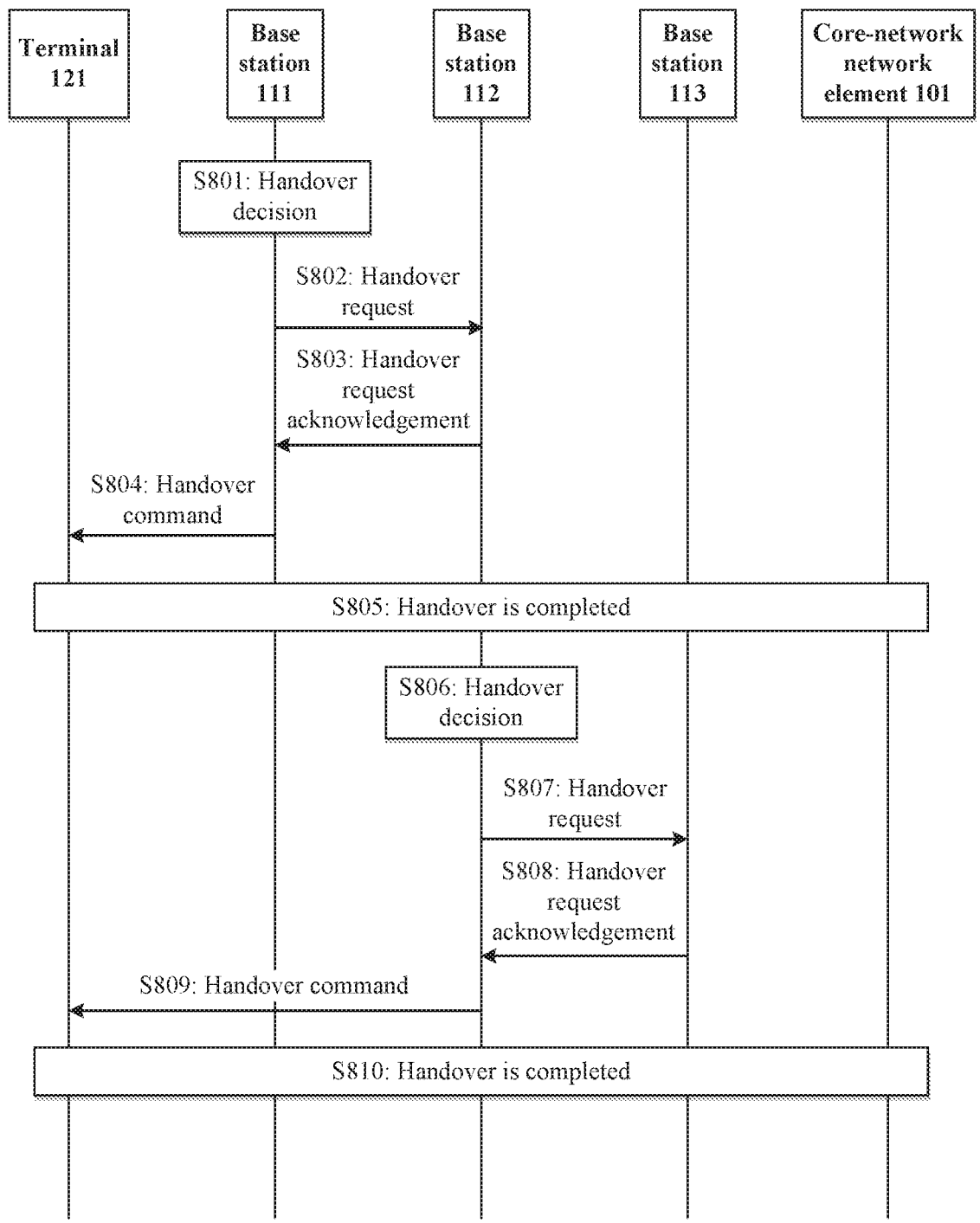
FIG. 8 is a flowchart of a handover method according to an embodiment of the present invention.

When the security capability information element carried in the handover request message is used, refer to FIG. 8:

S801 to S806 describe a procedure in which a terminal 121 is handed over from a base station 111 to a base station 112.

S801: The base station 111 makes handover decision and decides to hand over the terminal from the base station 111 to the base station 112.

S802: The base station 111 sends a handover request message to the base station 112.

The handover request message includes one or more security capabilities stored in the base station 111, for example, a first security capability and a second security capability, and for example, a 4G security capability and a 5G security capability.

The base station 112 can store the first security capability and the second security capability in the handover request message.

For example, the base station 112 supports the 4G security capability, but does not support the 5G security capability. The base station 112 does not have a corresponding field to save the 5G security capability. When the base station 112 saves the 4G security capability in the handover request message, the 5G security capability may be simultaneously stored in the field of the 4G security capability of the base station 112. The base station 112 may still read values of, for example, a first bit to a third bit, in the field of the 4G security capability, and further select an algorithm for communication with the terminal. The base station 112 does not read values of other bits, or the base station 112 reads values of other bits, but not configured with corresponding algorithms. Therefore, the values of other bits do not affect algorithm selection between the base station 112 and the terminal 121.

Although the base station 112 does not support the 4G security capability, the 4G security capability and the 5G security capability can be stored together in the base station 112. Therefore, the 5G security capability is not lost.

S803: The base station 112 sends a handover request acknowledgement message to the base station 111.

The base station 112 selects an integrity protection algorithm and an encryption algorithm that coexist both in the second security capability and in a configuration list of the base station 112, and that have a highest priority, adds identifiers of the algorithms to the handover request acknowledgement message, and sends the handover request acknowledgement message to the base station 111.

S804: The base station 111 sends a handover command message to the terminal 121.

The handover command message includes the algorithm identifiers received by the base station 111 in S803.

After the terminal 121 receives the algorithm identifiers, the terminal 121 may use the algorithms indicated by the algorithm identifiers, and use algorithms that are negotiated between the terminal 121 and the base station 111 in subsequent communication.

S805: The handover is completed.

S806 to S811 describe a procedure in which the terminal is handed over from the base station 112 to a base station 113.

S806: The base station 112 makes handover decision and decides to hand over the terminal 121 from the base station 112 to the base station 113.

After the terminal 121 is handed over to the base station 112, due to reasons of coverage, load, a service, or the like, the base station 112 may determine to hand over the terminal 121 from the base station 112 to the base station 113.

S807: The base station 112 sends a handover request message to the base station 113.

Because in S802, the base station 112 stores the first security capability and the second security capability, the base station 112 places the first security capability and the second security capability in an information element of the second security capability in the handover request message. Therefore, the handover request message includes the first security capability and the second security capability.

The base station 113 may store the first security capability and the second security capability after receiving the handover request message. For example, the base station 113 may read information from the information element of the 4G security capability in the handover request message, and store the information in the 4G security capability field, to obtain the 4G security capability and the 5G security capability. Alternatively, because the base station 113 supports the 5G security capability, the base station 113 may read the 5G security capability from the information element of the 4G security capability in the handover request message, and store the 5G security capability in a 5G security capability field.

By using the security capability information element carried in the initial context setup request message or the handover request message, it can be implemented that the base station 112 not supporting the first security capability does not lose the first security capability. After the base station 113 obtains the first security capability, more functions can be implemented between the base station 113 and the terminal 121, thereby improving user experience.

S808: The base station 113 sends a handover request acknowledgement message to the base station 112.

Because the base station 113 obtains the first security capability and the second security capability, the base station 113 may select an integrity protection algorithm and an encryption algorithm that coexist both in the first security capability and the second security capability and in a configuration list of the base station 113, and that have a highest priority, add identifiers of the algorithms to the handover request acknowledgement message, and send the handover request acknowledgement message to the base station 112.

S809: The base station 112 sends a handover command message to the terminal 121.

After the terminal 121 receives the algorithm identifiers, the terminal 121 may use the algorithms indicated by the algorithm identifiers, and use algorithms that are negotiated between the terminal 121 and the base station 111 in subsequent communication.

The terminal 121 and the base station 113 may use the first security capability. Compared with the second security capability, more functions can be implemented between the base station 113 and the terminal 121, thereby improving user experience.

S810: The handover is completed.

The following describes a communication method according to an embodiment of the present invention. Content described in the foregoing embodiments of the present invention may be incorporated in the method. In this method, during a handover in which a terminal 112 is handed over from a base station 112 to a base station 113, the base station 113 obtains a first security capability, and the handover is performed via an X2 interface between the base station 112 and the base station 113.

Obtaining the first security capability by the base station 113 may occur during the handover from the base station 112 to the base station 113, for example, in steps of handover decision, handover execution, or handover completion. Alternatively, obtaining the first security capability by the base station 113 may occur after the handover from the base station 112 to the base station 113, for example, after the terminal 121 performs random access to the base station 113. Alternatively, obtaining the first security capability by the base station 113 may occur before the base station 112 decides to hand over the terminal to the base station 113. This is not limited in this embodiment of the present invention.

For details, refer to the related content that the base station 113 obtains the first security capability in the foregoing embodiments of the present invention.

Further, the base station 113 sends the first security capability to a base station 114, to establish dual connections.

After the base station 113 obtains the first security capability, the base station 113 may learn that the terminal 121 supports dual connections, and sends the first security capability to the base station 114, so that the terminal 121 may establish dual connections to the base station 113 and the base station 114.

According to this method, the base station 113 obtains the first security capability during the handover, and the dual connections are established after the handover, so that the terminal 121 uses radio resources of two base stations simultaneously. This resolves a problem that a radio resource throughput of a base station still cannot meet a requirement after the handover of the terminal 121, and improves user experience.

Figure 9:
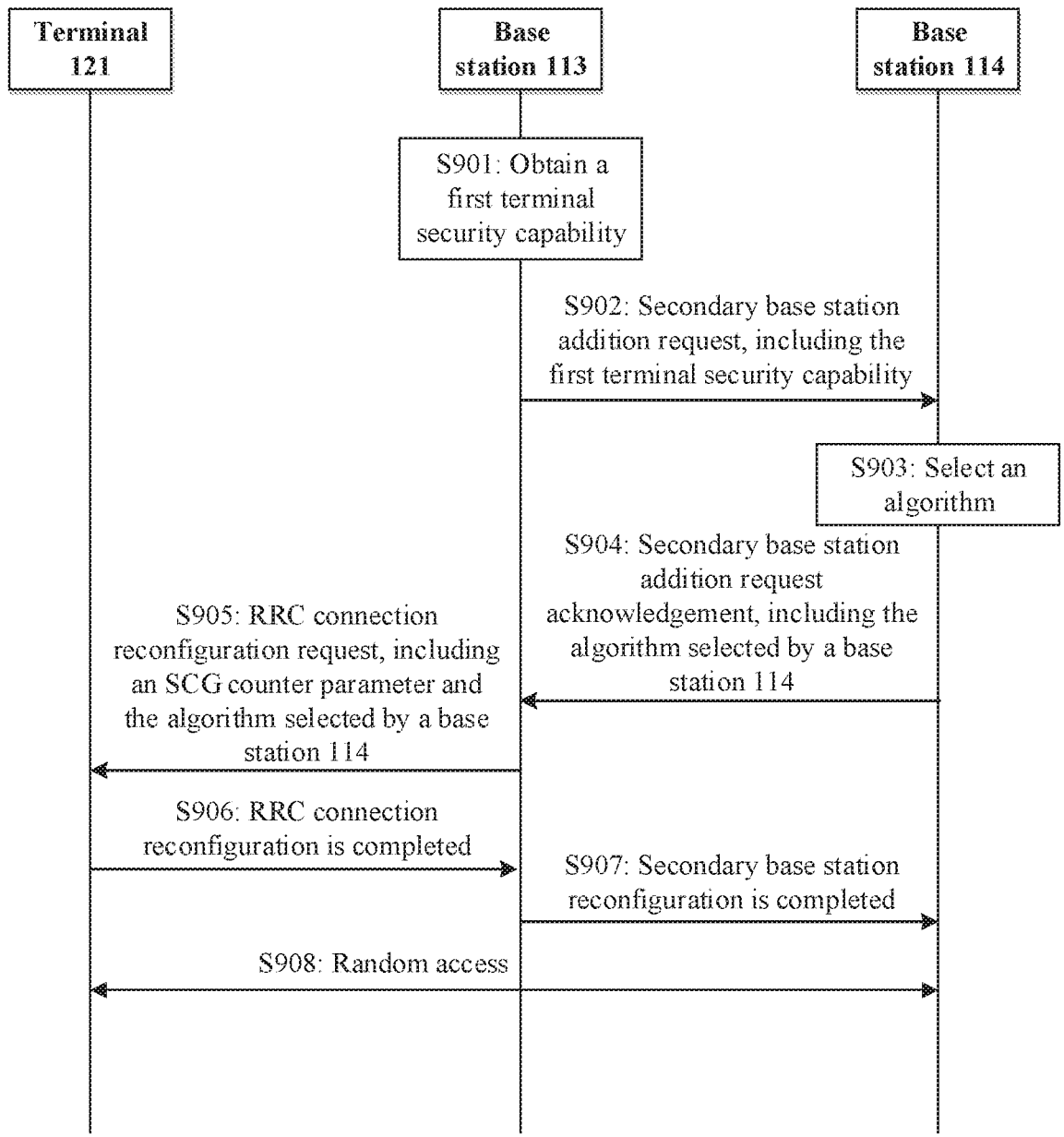
FIG. 9 is a flowchart of a method for implementing dual connections according to an embodiment of the present invention.

With reference to FIG. 9, the following describes a method for establishing dual connections according to an embodiment of the present invention. A base station 113 obtains a first security capability, and a terminal 121 establishes dual connections to the base station 113 and a base station 114. Content described in the foregoing embodiments of the present invention may be incorporated in the method.

S901: The base station 113 obtains a first security capability.

For S901, refer to the related content that the base station 113 obtains the first security capability in the foregoing embodiments of the present invention.

S902 to S908 describe a process in which the terminal 121 establishes the dual connections to the base station 113 and the base station 114 based on the first security capability.

S902: The base station 113 sends a secondary base station addition request message to the base station 114, where the secondary base station addition request message includes the first security capability.

The base station 113 determines whether the terminal 121 supports dual connections. Because the base station 113 obtains the first security capability in S901, the first security capability may indicate that the terminal 121 supports dual connections.

After determining that the terminal 121 has a dual-connection capability, the base station 113 sends the secondary base station addition request message to the base station 114, where the secondary base station addition request message includes the first security capability.

Optionally, the secondary base station addition request message further includes a root key.

S903: The base station 114 selects an encryption algorithm and an integrity protection algorithm.

Based on an encryption algorithm and an integrity protection algorithm that are supported in the first security capability, and an encryption algorithm and an integrity protection algorithm that are in a configuration list of the base station 114, the base station 114 selects the encryption algorithm and the integrity protection algorithm that exist in both the first security capability and the configuration list and that have a highest priority.

Optionally, if the base station 114 receives the root key, the base station 114 calculates a key of a user-plane integrity protection algorithm, a key of a user-plane encryption algorithm, a key of a control-plane integrity protection algorithm, and a key of a control-plane encryption algorithm.

S904: The base station 114 sends a secondary base station addition request acknowledgement message to the base station 113, where the secondary base station addition request acknowledgement message includes the encryption algorithm and the integrity protection algorithm selected by the base station 114.

S905: The base station 113 sends an RRC connection reconfiguration request message to the terminal 121, where the connection reconfiguration request message includes an SCG counter parameter (SCG counter parameter), the encryption algorithm, and the integrity protection algorithm. 10255, S906: The terminal 121 sends an RRC connection reconfiguration response message to the base station 113.

If the terminal 121 receives the SCG counter parameter, the terminal 121 calculates the root key based on the SCG counter parameter, and calculates the key of the user-plane integrity protection algorithm, the key of the user-plane encryption algorithm, the key of the control-plane integrity protection algorithm, and the key of the control-plane encryption algorithm.

When the terminal 121 sends an RRC connection reconfiguration complete message to the base station 113, the terminal 121 has activated the encryption algorithm and the integrity protection algorithm that are selected by the base station 114 and received in S905.

S907: The base station 113 sends an RRC connection reconfiguration complete message to the base station 114.

After the base station 114 receives the RRC connection reconfiguration complete message, the base station 114 may activate the encryption algorithm and the integrity protection algorithm that are selected by the base station 114.

S908: The terminal 121 performs random access to the base station 114.

If in S907, the base station 114 does not activate the encryption algorithm and the integrity protection algorithm selected by the base station 114, the base station 114 may activate the encryption algorithm and the integrity protection algorithm selected by the base station 114.

According to this method, the base station 113 obtains the first security capability, and the dual connections are established between the terminal 121, the base station 113, and the base station 114. This can resolve a problem that a radio resource throughput of the base station 113 still cannot meet a user requirement after the terminal 121 is handed over from the base station 112 to the base station 113. By establishing the dual connections, the terminal 121 may obtain more radio resources and a higher data transmission rate. In addition, this can avoid a problem such as service interruption or a handover failure caused by frequent handovers, and can improve user experience.

Figure 10:
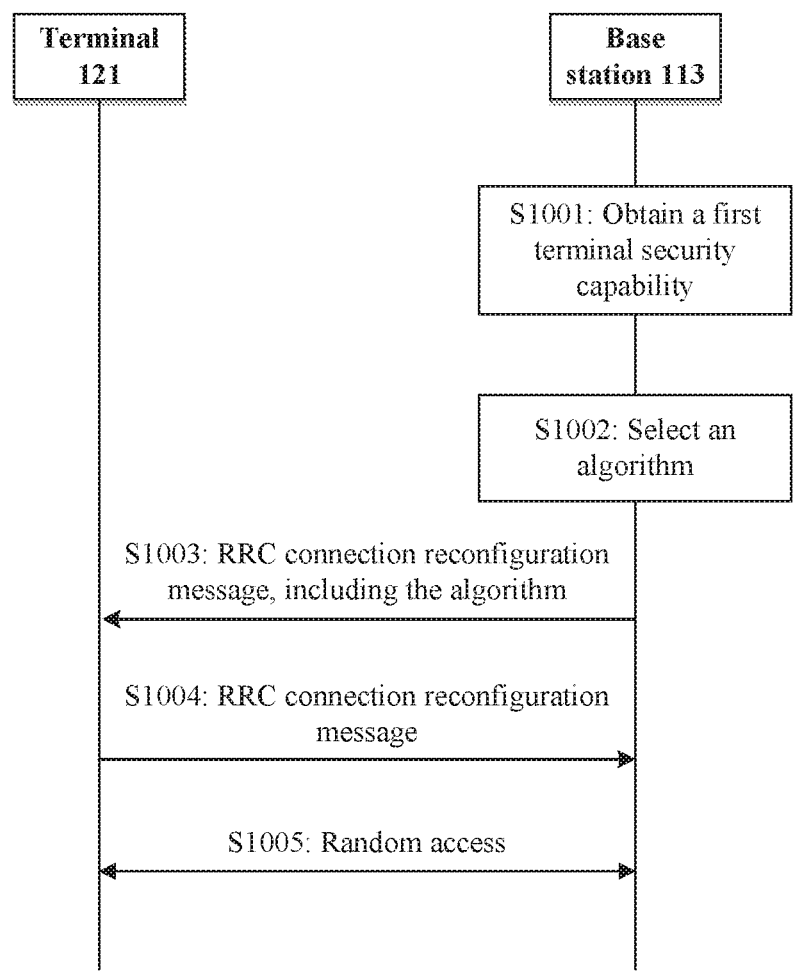
FIG. 10 is a flowchart of a method for using a first security capability according to an embodiment of the present invention.

With reference to FIG. 10, the following describes a method for obtaining a first security capability by a base station 113 and reselecting an encryption algorithm and an integrity protection algorithm by the base station 113 based on the first security capability according to an embodiment of the present invention, so as to improve network security between a terminal 121 and the base station 113, or implement a function of interaction between the terminal 121 and the base station 113. Content described in the foregoing embodiments of the present invention may be incorporated in the method.

S1001: The base station 113 obtains the first security capability.

Specifically, for S1001, refer to the related content that the base station 113 obtains the first security capability in the foregoing embodiments of the present invention.

S1002: The base station 113 selects an algorithm.

Based on an encryption algorithm and an integrity protection algorithm that are supported in the first security capability, and an encryption algorithm and an integrity protection algorithm that are in a configuration list of the base station 113, the base station 113 selects the encryption algorithm and the integrity protection algorithm that exist in both the first security capability and the configuration list and that have a highest priority.

S1003: The base station 113 sends an RRC connection reconfiguration message to the terminal 121, where the RRC connection reconfiguration message includes the reselected encryption algorithm and integrity protection algorithm.

The terminal 121 activates the received encryption algorithm and the integrity protection algorithm that are selected by the base station 113.

S1004: The terminal 121 sends an RRC connection reconfiguration complete message to the base station 113.

S1005: The terminal 121 performs random access to the base station 113.

The base station 113 activates the encryption algorithm and the integrity protection algorithm that are selected by the base station 113.

According to this method, the base station 113 obtains the first security capability, and sends the algorithms of the first security capability to the terminal 121. This can improve network security of communication between the terminal 121 and the base station 113, and reduce a possibility of being attacked or cracked, thereby ensuring good user experience.

With reference to content of the foregoing embodiments of the present invention, the following describes a communications apparatus 1100 according to an embodiment of the present invention. The communications apparatus 1100 may be the base station 113 or the base station 112 in the foregoing embodiments.

Figure 11:
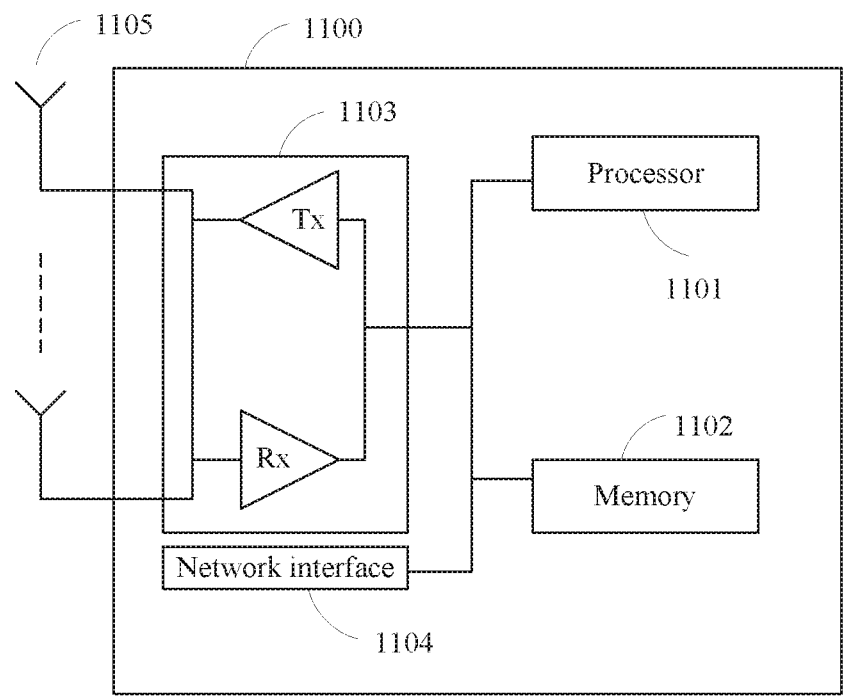
FIG. 11 is a schematic diagram of a communications apparatus according to an embodiment of the present invention.

The communications apparatus 1100 in FIG. 11 may be the base station 113 or the base station 112.

The communications apparatus 1100 includes at least one processor 1101, at least one memory 1102, at least one transceiver 1103, one or more antennas 1105, and at least one network interface 1104. The processor 1101, the memory 1102, the transceiver 1103, and the network interface 1104 are coupled via a connector, and the antenna 1105 is coupled to the transceiver 1103. The network interface 1104 is configured to be coupled to other communications devices via a communications link, connected to a network interface of another base station via, for example, an X2 interface, or coupled to a core-network device via an S1 interface. In this embodiment of the present invention, the connector may include various types of interfaces, transmission lines, buses, and the like. This is not limited in this embodiment. The coupling refers to a mutual relationship in a particular manner, including direct connection or indirect connection via another device.

The processor 1101 may include at least one of the following: a central processing unit (Central Processing Unit, CPU), a digital signal processor (Digital Signal Processor, DSP), a microprocessor, an application-specific integrated circuit (Application-Specific Integrated Circuit, ASIC), a microcontroller unit (Microcontroller Unit, MCU), a field programmable gate array (Field Programmable Gate Array, FPGA), or an integrated circuit used to implement logical operations. For example, the processor 1101 may be a single-core (single-CPU) processor or a multi-core (multi-CPU) processor. A plurality of processors or units included in the processor 1101 may be integrated into a single chip, or located on a plurality of different chips.

The memory 1102 may exist independently, and is coupled to the processor 1101 via a connector. Alternatively, the memory 1102 may be integrated with the processor 1101. The memory 1102 can store a variety of computer program code, including program code for executing the solutions of this application, and the processor 1101 controls execution of the program code. The variety of computer program code executed may be considered as a driver program of the processor 1101. For example, the processor 1101 is configured to execute the computer program code stored in the memory 1102, so as to implement the methods in the embodiments of the present invention.

The transceiver 1103 may be any apparatus configured to implement reception and transmission of a communications signal, and may be coupled to the antenna 1105. The transceiver 1103 includes a transmitter Tx and a receiver Rx. Specifically, the one or more antennas 1105 may receive a radio frequency signal. The receiver Rx of the transceiver 1103 is configured to receive the radio frequency signal from the antenna, convert the radio frequency signal into a digital baseband signal or a digital intermediate frequency signal, and send the digital baseband signal or the digital intermediate frequency signal to the processor 1101, so that the processor 1101 performs further processing on the digital baseband signal or the digital intermediate frequency signal, for example, demodulation processing and decoding processing. In addition, the transmitter Tx of the transceiver 1103 is further configured to receive a modulated digital baseband signal or a modulated digital intermediate frequency signal from the processor 1101, convert the modulated digital baseband signal or the modulated digital intermediate frequency signal into a radio frequency signal, and send the radio frequency signal via the one or more antennas 1105. Specifically, the receiver Rx may selectively perform one or more levels of frequency downmixing processing and analog-to-digital conversion processing on the radio frequency signal, so as to obtain the digital baseband signal or the digital intermediate frequency signal. A sequence of the frequency downmixing processing and the analog-to-digital conversion processing is adjustable. The transmitter Tx may selectively perform one or more levels of frequency upmixing processing and digital-to-analog conversion processing on the modulated digital baseband signal or the modulated digital intermediate frequency signal, so as to obtain the radio frequency signal. A sequence of the frequency upmixing processing and the analog-to-digital conversion processing is adjustable. The digital baseband signal and the digital intermediate frequency signal may be collectively referred to as digital signals.

The communications apparatus 1100 may be the base station 113, and the base station 113 communicates with the base station 112, a base station 114, and a core-network network element 101 via one or more network interfaces 1104. A network interface 1104 may be an X2 interface, and the base station 113 is connected to an X2 interface of the base station 112 via the X2 interface. Another network interface 1104 may be an Xn interface, and the base station 113 is connected to an Xn interface of the base station 114 via the Xn interface. Another network interface 1104 may be an S1 interface, and the base station 113 is connected to the core-network network element 101 via the S1 interface.

The processor 1101 may obtain a first security capability during a handover from the base station 112 to the base station 113. The processor 1101 may send the first security capability to the base station 114 via the Xn interface, to establish dual connections. For details, refer to the related content in the foregoing method embodiments.

Optionally, the processor 1101 may send, via the S1 interface to the core-network network element 101, an indication for obtaining the first security capability, and receive the first security capability sent by the core-network network element 101. For details, refer to S407 and S408 in FIG. 4. Optionally, before sending a request for obtaining a security capability, the processor 1101 may further determine whether to send the request for obtaining the first security capability. Optionally, the processor 1101 may determine whether the security capability sent by the base station 112 includes the first security capability. For details, refer to S406 in FIG. 4.

Optionally, the processor 1101 may receive, via the X2 interface, a second security capability sent by the base station 112, send the second security capability to the core-network network element 101 via the S1 interface, and receive, via the S1 interface, the first security capability sent by the core-network network element 101. For details, refer to S502, S506, and S508 in FIG. 5.

Optionally, the processor 1101 may receive, via the transceiver 1003 and the antenna 1005, the first security capability and the second security capability sent by the terminal 121. For details, refer to S604 in FIG. 6. Optionally, the processor 1101 may send, to the base station 112 via the X2 interface, the indication that enables the base station 112 to send, to the terminal, the security capability stored by the base station 112. For details, refer to S608 in FIG. 6.

The memory 1102 may store the first security capability or the second security capability received by the processor 1101, or the first security capability and the second security capability. The memory 1102 may store an algorithm corresponding to the first security capability or the second security capability. The memory 1102 may store data and program code, so that when the processor 1101 executes the data and the program code, related functions of the base station 113 can be implemented.

The communications apparatus 1100 may be the base station 112, and the base station 112 communicates with the base station 113 and the core-network network element 101 via one or more network interfaces 1104. A network interface 1104 may be an X2 interface, and the base station 112 is connected to an X2 interface of the base station 113 via the X2 interface. Another network interface 1104 may be an S1 interface, and the base station 112 is connected to the core-network network element 101 via the S interface.

Optionally, the processor 1101 may send a handover request message to the base station 113 via the X2 interface. The handover request message includes the first security capability and the second security capability, and the first security capability is stored in a field used to store the second security capability in the handover request message. For details, refer to S802 in FIG. 8.

Optionally, the processor 1101 may receive, via the X2 interface, indication information sent by the base station 113, where the indication information is used to instruct the base station 112 to send, to the terminal 121, the second security capability stored by the base station 112. The processor 1101 reads the second security capability stored in the memory 1102 and sends the second security capability to the terminal 121. For details, refer to S604 and S605 in FIG. 6.

Optionally, the processor 1101 may receive, via the S1 interface, an initial context setup request message sent by the core-network network element 101, where the initial context setup request message includes the first security capability and the second security capability, and the first security capability is stored in a field in the initial context setup request message and used to store the second security capability. For details, refer to the related content in FIG. 7a and FIG. 7b.

Optionally, the processor 1101 may receive, via the interface, a handover request message sent by the base station ill, where the handover request message includes the first security capability and the second security capability, and the first security capability is stored in a field used to store the second security capability in the handover request message. For details, refer to the related content in FIG. 7a, FIG. 7b, and S802 in FIG. 8.

Figure 12A:
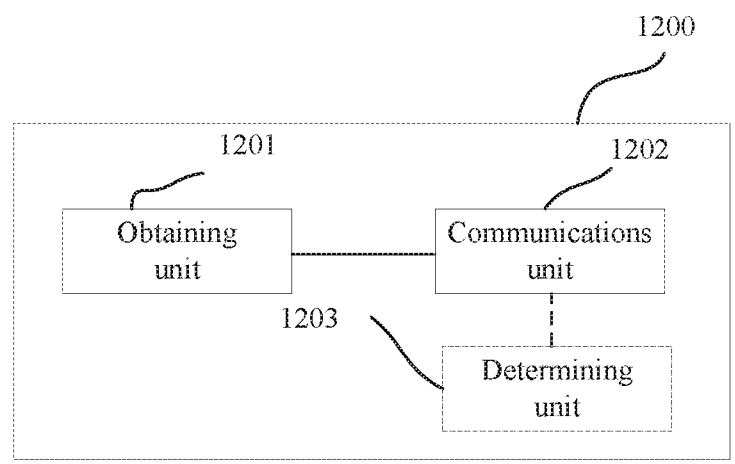
FIG. 12a is a schematic diagram of a base station according to an embodiment of the present invention.

With reference to content of the foregoing embodiments of the present invention and with reference to FIG. 12a, the following describes a base station 1200 according to an embodiment of the present invention.

The base station 1200 may be the base station 113 in the foregoing embodiments.

The base station 1200 includes an obtaining unit 1201 and a communications unit 1202, where the obtaining unit 1201 and the communications unit 1202 are connected.

The obtaining unit 1201 is configured to obtain a first security capability during a handover from a base station 112 to the base station 113, and the communications unit 1202 is configured to send the first security capability to a base station 114, to establish dual connections. For details, refer to the related content in the foregoing embodiments of the present invention.

Optionally, the communications unit 1202 may be further configured to send, to a core-network network element 101, a request for obtaining the first security capability, and receive the first security capability sent by the core-network network element. For details, refer to S407 and S408 in FIG. 4.

Optionally, the base station may further include a determining unit 1203, configured to, determine that a security capability sent by the base station 112 and received by the base station 113 does not include the first security capability, so that the communications unit 1202 sends, to the core-network network element 101, the request for obtaining the first security capability. For details, refer to S406 in FIG. 4.

Optionally, the communications unit 1202 is configured to receive a second security capability sent by the base station 112, send the second security capability to the core-network network element 101, and receive the first security capability sent by the core network 101. For details, refer to S502, S506, and S508 in FIG. 5.

Optionally, the communications unit 1202 is configured to receive the first security capability and the second security capability sent by the terminal 121. Optionally, the communications unit 1202 may be further configured to send, to the base station 112, an indication that enables the base station 112 to send, to the terminal, the security capability stored by the base station 112. For details, refer to S604 and S608 in FIG. 6.

The following describes another base station 1210 according to an embodiment of the present invention.

Figure 12B:
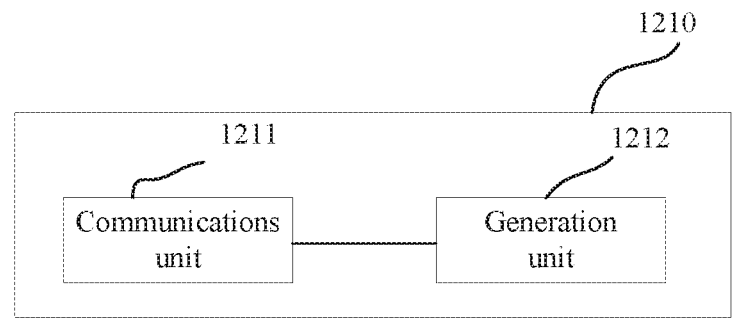
FIG. 12b is a schematic diagram of another base station according to an embodiment of the present invention.

The base station 1210 in FIG. 12b may be the base station 112 in the foregoing embodiments.

The base station 1210 includes a communications unit 1211 and a generation unit 1212, where the generation unit 1212 is configured to generate a security capabilities during a handover from the base station 112 to a base station 113. The security capability includes a first security capability and a second security capability, and the first security capability is stored in a field used to store the second security capability. The communications unit 1211 is configured to send a handover request message to the base station 113, where the handover request message includes the first security capability and the second security capability, and the first security capability is stored in a field in the handover request message and used to store the second security capability. For details, refer to S802 in FIG. 8.

Optionally, the communications unit 1211 is further configured to receive indication information sent by the base station 113, where the indication information is used to instruct the base station 112 to send, to a terminal 121, the second security capability stored by the base station 112. The generation unit 1212 is configured to generate the second security capability, and the communications unit is further configured to send, to the terminal, the second security capability stored by the base station 112. For details, refer to S604 and S605 in FIG. 6.

Optionally, the communications unit 1211 is further configured to receive an initial context setup request message sent by a core-network network element 101, where the initial context setup request message includes the first security capability and the second security capability, and the first security capability is stored in a field used to store the second security capability in the initial context setup request message. For details, refer to the related content in FIG. 7a and FIG. 7b.

Optionally, the communications unit 1211 is further configured to receive a handover request message sent by the base station 111, where the handover request message includes the first security capability and the second security capability, and the first security capability is stored in a field used to store the second security capability in the handover request message. For details, refer to the related content in FIG. 7a, FIG. 7b, and S802 in FIG. 8.

Figure 13:
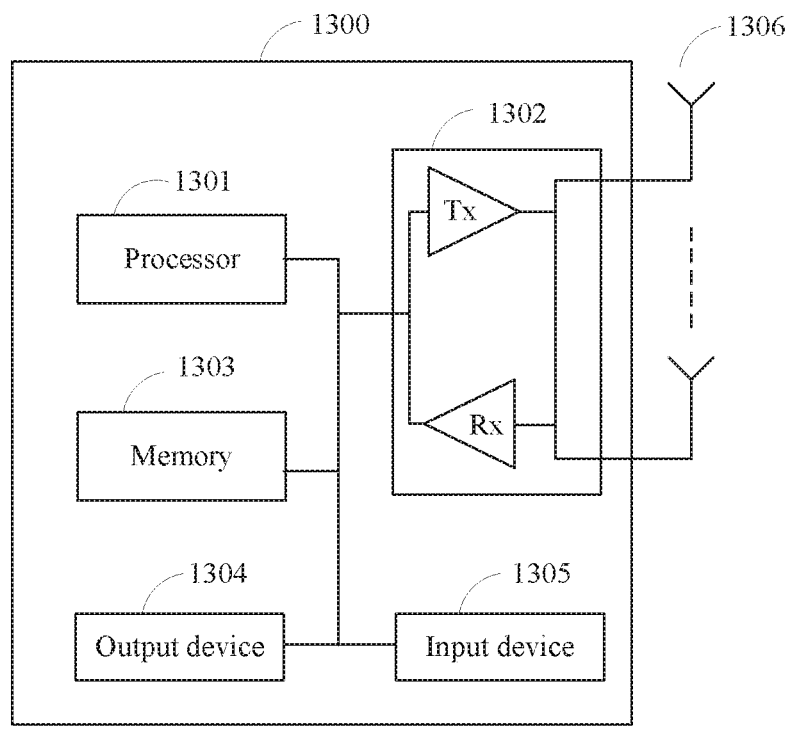
FIG. 13 is a schematic diagram of a terminal according to an embodiment of the present invention.

With reference to content of the foregoing embodiments of the present invention and with reference to FIG. 13, the following describes a terminal 1300 according to an embodiment of the present invention. The terminal 1300 may be the terminal 121 in the foregoing embodiments.

The terminal 121 includes at least one processor 1301, at least one transceiver 1302, and at least one memory 1303. The processor 1301, the memory 1303, and the transceiver 1302 are coupled via a connector. Optionally, the terminal 121 may further include an output device 1304, an input device 1305, and one or more antennas 1306. The antenna 1306 is coupled to the transceiver 1302, and the output device 1304 and the input device 1305 are coupled to the processor 1301.

For the processor 1301, the transceiver 1302, the memory 1303, and the antenna 1306, refer to the related descriptions in FIG. 11. Similar functions are implemented.

The output device 1304 communicates with the processor 1301, and may display information in a plurality of manners. For example, the output device 1304 may be a liquid crystal display (Liquid Crystal Display, LCD), a light emitting diode (Light Emitting Diode, LED) display device, a cathode ray tube (Cathode Ray Tube. CRT) display device, a projector (projector), or the like. The input device 1305 communicates with the processor 1301, and may receive a user input in a plurality of manners. For example, the input device 1305 may be a mouse, a keyboard, a touchscreen device, a sensor device, or the like.

The terminal 121 may communicate with a base station 111 via the transceiver 1302 and the antenna 1306, then handed over to a base station 112, communicate with the base station 112 via the transceiver 1302 and the antenna 1306, then handed over to a base station 113, and communicate with the base station 113 via the transceiver 1302 and the antenna 1306. After the base station 113 sends a first security capability to a base station 114, and the terminal 121 maintains a connection to the base station 113, the terminal 121 establishes a connection to the base station 114 via the transceiver 1302 and the antenna 1306. For details, refer to the related content in the foregoing embodiments of the present invention and FIG. 9.

Optionally, the processor 1301 may send the first security capability to the base station 113 via the transceiver 1302 and the antenna 1306. For details, refer to S608 in FIG. 6.

Optionally, the processor 1301 may receive, via the transceiver 1302 and the antenna 1306, a second security capability sent by the base station 112. The memory 1303 stores one or more security capabilities, including the first security capability and the second security capability. The processor 1301 compares the received second security capability with the one or more security capability stored by the memory 1303. When the security capabilities are inconsistent, the processor 1301 sends the first security capability to the base station 113 via the transceiver 1302 and the antenna 1306. For details, refer to S605, S606, and S608 in FIG. 6.

Optionally, the processor 1301 may receive an algorithm that is selected by the base station 114 based on the first security capability and that is sent by the base station 113. The terminal 121 establishes a connection to the base station 114 via the transceiver 1302 and the antenna 1306. Refer to S1003 to S1005 in FIG. 10.

The memory 1303 may store the first security capability or the second security capability received by the processor 1301, or the first security capability and the second security capability received by the processor 1301. The memory 1303 may store algorithms corresponding to the first security capability and the second security capability. The memory 1303 may store data and program code, so that when the processor 1301 executes the data and the program code, related functions of the terminal 121 can be implemented.

Figure 14:
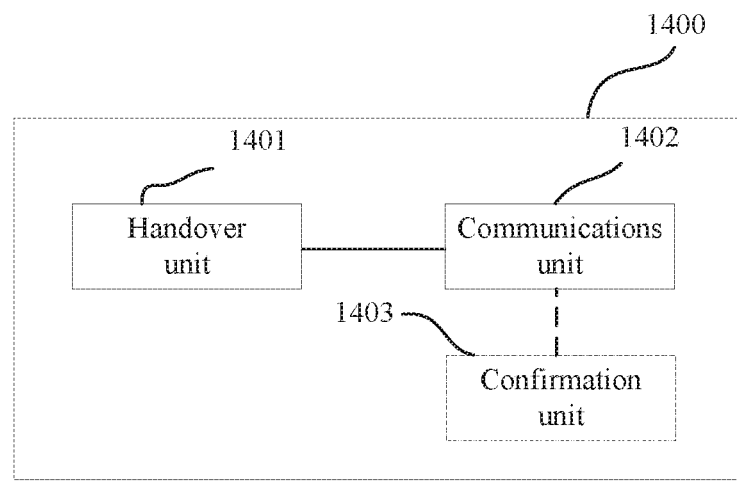
FIG. 14 is a schematic diagram of another terminal according to an embodiment of the present invention.

With reference to content of the foregoing embodiments of the present invention and with reference to FIG. 14, the following describes another terminal 1400 according to an embodiment of the present invention. The terminal may be the terminal 121 in the foregoing embodiments.

The terminal 1400 includes a handover unit 1401 and a communications unit 1402.

The handover unit 1401 is configured to hand over the terminal 121 from a base station 112 to a base station 113, and the communications unit 1402 is configured to enable the terminal 121 to communicate with the base station 114 simultaneously when communicating with the base station 113. For details, refer to the related content in the foregoing embodiments of the present invention.

Optionally, the communications unit 1402 may be further configured to send a first security capability to the base station 113. For details, refer to the related content of S608 in FIG. 6.

Optionally, the communications unit 1402 may be further configured to receive a second security capability sent by the base station 112, and send the second security capability to the base station 113. The terminal 121 further includes a confirmation unit, configured to confirm that the second security capability is inconsistent with one or more security capabilities stored by the terminal 121, so that the communications unit 1402 sends the first security capability to the base station 113. The terminal 121 further includes a storage unit, configured to store the first security capability and the second security capability. For details, refer to the related content of S606 and S608 in FIG. 6.

Optionally, the communications unit 1402 may be configured to receive an algorithm that is selected by the base station 114 based on the first security capability and that is sent by the base station 113, and communicate with the base station 114 based on the algorithm. Refer to S1003 to S1005 in FIG. 10.

Figure 15A:
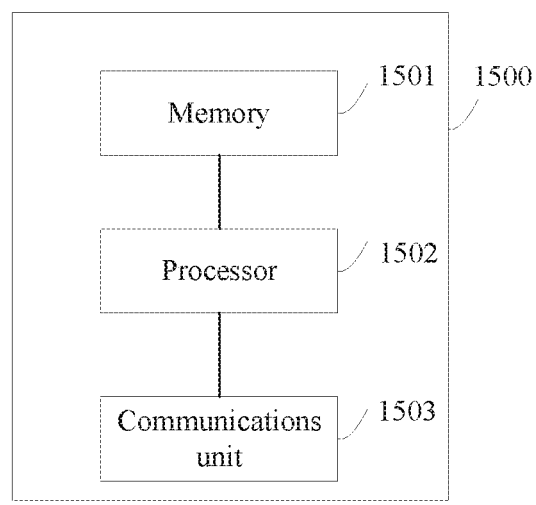
FIG. 15a is a schematic diagram of a core-network network element according to an embodiment of the present invention.

With reference to content of the foregoing embodiments of the present invention and with reference to FIG. 15a, the following describes a core-network network element 1500 according to an embodiment of the present invention.

The core-network network element 1500 may be the core-network network element 101 in the foregoing embodiments.

The core-network network element 1500 includes a memory 1501, a processor 1502, and a communications unit 1503. For the memory 1501 and the processor 1502, refer to the related descriptions in FIG. 11. Similar functions are implemented. The communications unit 1503 may send data to or receive data from another device, such as a base station 111, a base station 112, a base station 113, or a terminal 121.

The memory 1501 may store one or more security capabilities received by the core-network network element 101, such as a first security capability and a second security capability.

Optionally, the communications unit 1503 may send the first security capability to the base station 113. For details, refer to S408 in FIG. 4 and S508.

Optionally, the communications unit 1503 may receive an indication that is for obtaining the first security capability and that is sent by the base station 113. The processor 1502 may read the first security capability stored in the memory 1501 according to the indication. The communications unit 1503 may send the first security capability to the base station 113. For details, refer to S407 and S408 in FIG. 4.

Optionally, the communications unit 1503 may receive a second security capability sent by the base station 113. The processor 1502 reads a security capability in the memory 1501, such as the first security capability and the second security capability, and compares the received second security capability with the security capability in the memory 1501. When the security capabilities are inconsistent, the communications unit 1503 sends the first security capability to a second base station. For details, refer to S506 to S508.

Optionally, the communications unit 1503 may send an initial context setup request message to the base station 112, where the initial context setup request message includes the first security capability and the second security capability, and the first security capability is stored in a field of the second security capability. For details, refer to the related content in FIG. 7a and FIG. 7b.

Figure 15B:
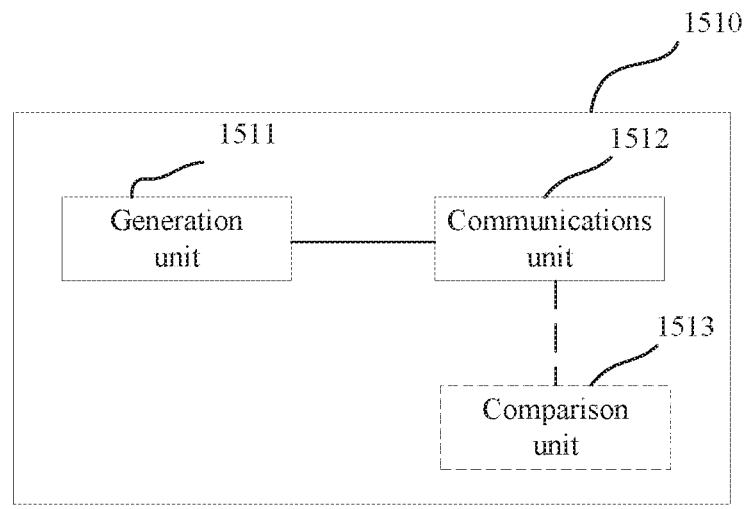
FIG. 15b is a schematic diagram of another core-network network element according to an embodiment of the present invention.

With reference to content of the foregoing embodiments of the present invention and with reference to FIG. 15b, the following describes another core-network network element 1510 according to an embodiment of the present invention. The core-network network element 1510 may be the core-network network element 101 in the foregoing embodiments.

The core-network network element 1510 includes a generation unit 1511 and a communications unit 1512.

The generation unit 1511 is configured to generate a first security capability. The communications unit 1512 is configured to send the first security capability to a base station 113. Optionally, the generation unit 1511 is configured to generate the first security capability and a second security capability. The communications unit 1512 is configured to send the first security capability and the second security capability to the base station 113. For details, refer to S408 in FIG. 4 and S508 in FIG. 5.

Optionally, the communications unit 1512 may receive an indication that is for obtaining the first security capability and that is sent by the base station 113. The generation unit 1511 may generate the first security capability according to the indication. For details, refer to S407 in FIG. 4.

Optionally, the communications unit 1512 further includes a comparison unit 1513. The communications unit 1512 may receive the second security capability sent by the base station 113, and the comparison unit 1513 may compare the second security capability with one or more security capabilities stored by the core-network network element 1510, such as the first security capability and the second security capability. When the security capabilities are inconsistent, the communications unit 1512 sends the first security capability to the second base station. For details, refer to S506 to S508 in FIG. 5.

Figure 16:
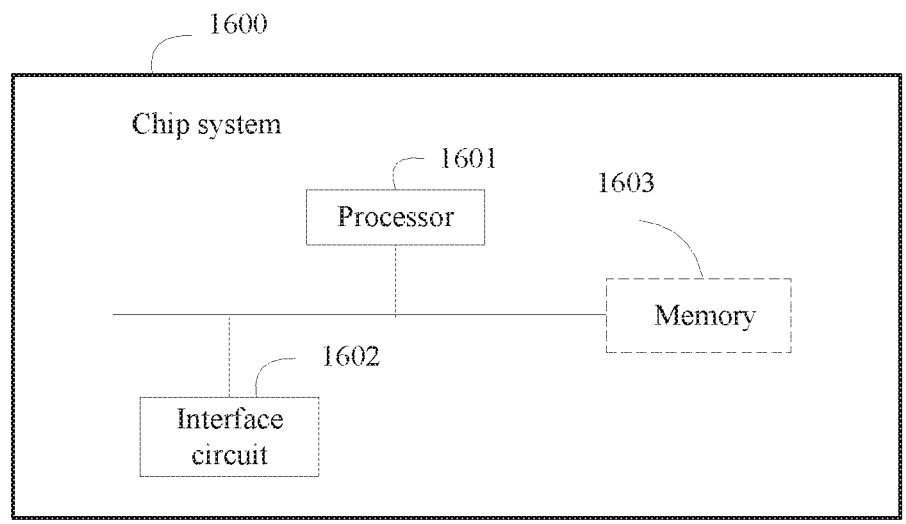
FIG. 16 is a schematic diagram of a chip system according to an embodiment of the present invention.

With reference to FIG. 16, the following describes a chip system 1600 according to an embodiment of the present invention.

The chip system 1600 includes at least one processor 1601 and an interface circuit 1602, where the processor 1601 is connected to the interface circuit 1602.

The processor 1601 may be an integrated circuit chip and has a signal processing capability. In an implementation process, steps in the foregoing methods can be implemented by using a hardware integrated logical circuit in the processor 1601, or by using instructions in a form of software. The processor 1601 may be a general purpose processor, a digital signal processor (DSP), an application-specific integrated circuit (ASIC), a field programmable gate array (FPGA) or another programmable logic device, a discrete gate or transistor logic device, or discrete hardware component. It may implement or perform the methods, the steps, and logical block diagrams that are disclosed in the embodiments of the present invention. The general purpose processor may be a microprocessor, or the processor may be any conventional processor or the like.

The interface circuit 1602 may complete sending or receiving of data, an instruction, or information. The processor 1601 may perform processing by using the data, the instruction, or other information received by the interface circuit 1602, and send processed information via the interface circuit 1602.

Optionally, the chip system 1600 further includes a memory 1603. The memory 1603 may include a read-only memory and a random access memory, and provide an operation instruction and data to the processor 1601. A part of the memory 1603 may include a non-volatile random access memory (NVRAM).

Optionally, the memory 1603 stores an executable software module or a data structure. The processor 1601 may perform corresponding operations by invoking the operation instruction stored in the memory 1603 (the operation instruction may be stored in an operating system).

Optionally, the chip system 1600 may be applied to a base station 112, a base station 113, a base station 114, a terminal 121, or a core-network network element 101. Optionally, the interface circuit 1602 is configured to perform receiving and sending steps of the base station 112, the base station 113, the base station 114, the terminal 121, or the core-network network element 101 in the embodiments shown in FIG. 2 to FIG. 10. The processor 1601 is configured to perform processing steps of the base station 112, the base station 113, the base station 114, the terminal 121, or the core-network network element 101 in the embodiments shown in FIG. 2 to FIG. 10. The memory 1603 is configured to store data and an instruction of the base station 112, the base station 113, the base station 114, the terminal 121, or the core-network network element 101 in the embodiments shown in FIG. 2 to FIG. 10.

For example, when the chip system 1600 is applied to the base station 113, an indication for obtaining a first security capability may be sent to the core-network network element 101 via the interface circuit 1602, and the first security capability sent by the core-network network element 101 is received. For details, refer to S407 and S408 in FIG. 4. Optionally, before sending a request for obtaining a security capability, the processor 1101 may further determine whether to send the request for obtaining the first security capability. Optionally, the processor 1101 may determine whether the security capability that is sent by the base station 112 and that is received via the interface circuit 1602 includes the first security capability. For details, refer to S406 in FIG. 4. The memory 1603 may store the first security capability or a second security capability received via the interface circuit 1602, or the first security capability and the second security capability received via the interface circuit 1602. Optionally, the second security capability may be sent to the core-network network 101 via the interface circuit 1602, and the first security capability sent by the core network 101 may be received via the interface circuit 1602. For details, refer to S502, S506, and S508 in FIG. 5.

An embodiment of the present invention further provides a computer-readable medium. All or some of the methods described in the foregoing method embodiments may be implemented by using software, hardware, firmware, or any combination thereof. If a function is implemented in software, the function may be used as one or more instructions or code stored in the computer-readable medium or transferred by using the computer-readable medium. The computer-readable medium may include a computer storage medium and a communications medium, and may further include any medium that can transfer a computer program from a place to another place. The storage medium may be any available medium that can be accessed by a computer.

In an optional design, the computer-readable medium may include a RAM, a ROM, an EEPROM, a CD-ROM, or another optical disc storage device or disk storage device, or another magnetic storage device, or any other medium that can carry or store required program code in a form of an instruction or a data structure and can be accessed by a computer. In addition, any connection is properly called a computer-readable medium. For example, if software is transmitted from a website, a server, or another remote source via a coaxial cable, an optical cable, a twisted pair, a digital subscriber line (DSL), or wireless technologies (such as infrared ray, radio, and microwave), the coaxial cable, the optical cable, the twisted pair, the DSL, or the wireless technologies such as infrared ray, radio, and microwave are included in a definition of a medium. The magnetic disk and optical disc used herein include a compact disk (CD), a laser disk, an optical disc, a digital versatile disc (DVD), a floppy disk, and a Blu-ray disc, where the magic disk generally magnetically reproduces data, and the optical disc optically reproduces data by using laser. A combination thereof should also be included in the scope of the computer-readable medium.

An embodiment of the present invention further provides a computer program product. All or some of the methods described in the foregoing method embodiments may be implemented by using software, hardware, firmware, or any combination thereof. When the methods are implemented by using software, the methods may be implemented completely or partially in a form of a computer program product. The computer program product includes one or more computer instructions. When the computer program instructions are loaded and executed on a computer, the procedure or functions described in the foregoing method embodiments are all or partially generated. The computer may be a general-purpose computer, a dedicated computer, a computer network, a network device, user equipment, or another programmable apparatus.

The objectives, technical solutions, and benefits of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on technical solutions of the present invention shall fall within the protection scope of the present invention.

What is claimed is:

1. A communication system, comprising:
    a core-network network element, configured to send a first security capability of a terminal to a second base station during a handover from a first base station not supporting the first security capability to the second base station supporting the first security capability, wherein the handover is performed via an interface between the first base station and the second base station; and
    the second base station, configured to:
        receive a second security capability of the terminal from the first base station;
        receive the first security capability from the core-network network element, wherein the first security capability does not comprise the second security capability; and
        send the first security capability to a third base station supporting the first security capability to establish dual connections for the terminal, wherein the dual connections comprises a connection between the terminal and the second base station, and a connection between the terminal and the third base station.

2. The system according to claim 1, wherein the second base station is further configured to send a path switch request message to the core-network network element, wherein the path switch request message comprises the second security capability; and
    the core-network network element is further configured to receive the path switch request message from the second base station; and
    the core-network network element is configured to, in response to determining that the second security capability comprised in the path switch request message is inconsistent with one or more security capabilities stored in the core-network network element, send the first security capability to the second base station.

3. The system according to claim 2, wherein the second base station is further configured to:
    receive the second security capability from the first base station during the handover; and
    after negotiating one or more security algorithms based on the second security capability with the terminal, receive the first security capability from the core-network network element.

4. The system according to claim 2, wherein the interface between the first base station and the second base station is an X2 interface, the first security capability is a 5G (fifth generation) security capability and the second security capability is a 4G (fourth generation) security capability.

5. The system according to claim 1, wherein the second base station is configured to:
    send a secondary base station addition request message to the third base station, wherein the secondary base station addition request message comprises the first security capability;
    receive a secondary base station addition request acknowledgement message sent by the third base station, wherein the secondary base station addition request acknowledgement message comprises one or more algorithms selected by the third base station based on the first security capability; and
    send the selected one or more algorithms to the terminal.

6. A communication method, comprising:
    receiving, by a second base station, a second security capability of a terminal from a first base station;
    receiving, by the second base station, a first security capability of the terminal from a core-network network element during a handover from the first base station not supporting the first security capability to the second base station supporting the first security capability, wherein the first security capability does not comprise the second security capability; and sending, by the second base station, the first security capability to a third base station supporting the first security capability to establish dual connections for the terminal, wherein the dual connections comprises a connection between the terminal and the second base station, and a connection between the terminal and the third base station.

7. The method according to claim 6, wherein the method further comprises:
sending, by the second base station, a path switch request message to the core-network network element, wherein the path switch request message comprises the second security capability.

8. The method according to claim 7, wherein the method further comprises:
receiving, by the second base station, the second security capability from the first base station during the handover; and
after negotiating one or more security algorithms based on the second security capability with the terminal, receiving, by the second base station, the first security capability from the core-network network element.

9. The method according to claim 7, wherein the handover is performed via an interface between the first base station and the second base station, the interface between the first base station and the second base station is an X2 interface, the first security capability is a 5G (fifth generation) security capability and the second security capability is a 4G (fourth generation) security capability.

10. The method according to claim 6, wherein the method further comprises:
sending, by the second base station, a secondary base station addition request message to the third base station, wherein the secondary base station addition request message comprises the first security capability;
receiving, by the second base station, a secondary base station addition request acknowledgement message sent by the third base station, wherein the secondary base station addition request acknowledgement message comprises one or more algorithms selected by the third base station based on the first security capability; and
sending, by the second base station, the selected one or more algorithms to the terminal.

11. The method according to claim 6, wherein the method further comprises:
sending, by the core-network network element, the first security capability to the second base station during the handover.

12. The method according to claim 11, wherein the method further comprises:
receiving, by the core-network network element, a path switch request message from the second base station, wherein the path switch request message comprises the second security capability; and
in response to determining that the second security capability comprised in the path switch request message is inconsistent with one or more security capabilities stored in the core-network network element, sending, by the core-network network element, the first security capability to the second base station.

13. An apparatus for a base station, comprising at least one processor and a memory coupled to the at least one processor and storing programming instructions for execution by the at least one processor, wherein the programming instructions instruct the at least one processor to perform operations comprising:
receiving a second security capability of a terminal from a first base station;
receiving a first security capability from a core-network network element during a handover from the first base station not supporting the first security capability to the base station supporting the first security capability, wherein the handover is performed via an interface between the first base station and the base station, wherein the first security capability does not comprise the second security capability; and
sending the first security capability to a third base station supporting the first security capability to establish dual connections for the terminal, wherein the dual connections comprises a connection between the terminal and the base station, and a connection between the terminal and the third base station.

14. The base station according to claim 13, wherein the operations further comprise:
sending a path switch request message to the core-network network element, wherein the path switch request message comprises the second security capability.

15. The base station according to claim 14, wherein the operations further comprise:
receiving the second security capability from the first base station during the handover; and
after negotiating one or more security algorithms based on the second security capability with the terminal, receiving the first security capability from the core-network network element.

16. The base station according to claim 14, wherein the interface between the first base station and the base station is an X2 interface the first security capability is a 5G (fifth generation) security capability and the second security capability is a 4G (fourth generation) security capability.

17. The base station according to claim 13, wherein the sending the first security capability to a third base station supporting the first security capability, to establish dual connections for the terminal comprises:
sending a secondary base station addition request message to the third base station, wherein the secondary base station addition request message comprises the first security capability;
receiving a secondary base station addition request acknowledgement message sent by the third base station, wherein the secondary base station addition request acknowledgement message comprises one or more algorithms selected by the third base station based on the first security capability; and
sending the selected one or more algorithms to the terminal.

* * * * *